United States Patent
Uchida

(10) Patent No.: US 10,705,259 B2
(45) Date of Patent: Jul. 7, 2020

(54) OPTICAL ELEMENT, METHOD FOR MANUFACTURING OPTICAL ELEMENT, OPTICAL SYSTEM, AND OPTICAL APPARATUS

(71) Applicant: CANON KABUSHIKI KAISHA, Tokyo (JP)

(72) Inventor: Kazue Uchida, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 121 days.

(21) Appl. No.: 16/151,629

(22) Filed: Oct. 4, 2018

(65) Prior Publication Data
US 2019/0107650 A1  Apr. 11, 2019

(30) Foreign Application Priority Data
Oct. 6, 2017  (JP) .............................. 2017-195531

(51) Int. Cl.
*G02B 1/115* (2015.01)
(52) U.S. Cl.
CPC .................. *G02B 1/115* (2013.01)
(58) Field of Classification Search
CPC .................................................. G02B 1/115
USPC .......................................................... 359/601
See application file for complete search history.

(56) References Cited

U.S. PATENT DOCUMENTS

| | | | | |
|---|---|---|---|---|
| 2004/0180138 | A1* | 9/2004 | Nishida | G02B 1/115 427/164 |
| 2014/0322502 | A1* | 10/2014 | Koyama | G02B 1/115 428/212 |
| 2018/0348510 | A1* | 12/2018 | Yasuda | B32B 15/04 |

FOREIGN PATENT DOCUMENTS

JP  2013250295 A  12/2013

OTHER PUBLICATIONS

"Seeing Photons: Progress and Limits of Visible and Infrared Sensor Arrays"; Committee on Developments in Detector Technologies; National Research Council, 2010, 52 pages.

* cited by examiner

*Primary Examiner* — Collin X Beatty
(74) *Attorney, Agent, or Firm* — Carter, DeLuca & Farrell LLP

(57) ABSTRACT

An optical element includes a substrate, and an antireflection film formed on the substrate and including a plurality of layers. The optical element satisfies predetermined conditions.

15 Claims, 17 Drawing Sheets

OPTICAL ELEMENT, METHOD FOR MANUFACTURING OPTICAL ELEMENT, OPTICAL SYSTEM, AND OPTICAL APPARATUS

BACKGROUND OF THE INVENTION

Field of the Invention

The present invention relates to an antireflection film or coating having a multilayer film.

Description of the Related Art

An optical apparatus, such as a surveillance camera, is required to capture not only visible light but also near-infrared light in the dark at night etc. This optical apparatus needs to reduce the reflectance of the lens in the visible and near-infrared regions in order to suppress the flares and ghosts in an acquired image.

Japanese Patent Laid-Open No. ("JP") 2013-250295 discloses an antireflection film made by alternately laminating a high refractive index material and a low refractive index material, and by providing a layer of an ultra-low refractive index material onto a top layer, wherein the antireflection film provides an antireflection in both the visible and near-infrared regions.

The reflectance of the antireflection film disclosed in JP 2013-250295 becomes higher in a wavelength band of 1600 nm or higher and 1% or higher near 1700 nm. Since the airglow (atmospheric light) emission has a peak from 1450 nm to 1800 nm, the antireflection performance of the antireflection film disclosed in JP 2013-250295 is insufficient for the airglow.

SUMMARY OF THE INVENTION

The present invention provides an optical element, a method of manufacturing an optical element, an optical system, and an optical apparatus, which has a high antireflection performance in the visible and near-infrared regions.

An optical element according to one aspect of the present invention includes a substrate, and an antireflection film formed on the substrate and including a plurality of layers. The following conditions are satisfied:

$$1.10 \leq n_m \leq 1.30$$

$$\text{when } \lambda=430, (a-1.25)^2+(b-0.28)^2 \leq 0.45^2$$

$$\text{when } \lambda=1000, (a-1.34)^2+(b+0.28)^2 \geq 0.30^2$$

$$\text{when } \lambda=1800, (a-1.14)^2+(b+0.24)^2 \leq 0.30^2$$

where $n_m$ is a refractive index for a wavelength $\lambda$ ($n_m$) of a top layer most distant from the substrate among the plurality of layers, and a base layer except the top layer among the plurality of layers has an optical admittance of $Y=a+ib$.

A manufacturing method according to another aspect of the present invention of the above optical element that includes a substrate, and an antireflection film formed on the substrate and including a plurality of layers includes the steps of producing a base layer except a top layer most distant from the substrate among the plurality of layers, and producing the top layer among the plurality of layers. An optical system or apparatus including the above optical element also constitutes one aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of one embodiment according to the present invention.

Imaging in the dark can be made using airglow emitted by a chemical reaction or an electromagnetic reaction in the atmosphere. The airglow is generated in a wavelength band from the visible region to the near-infrared region, but it is known that it has a strong peak near 1600 nm when observed on the ground due to the balance with the atmosphere light transmittance (see, for example, "Seeing Photons: Progress and Limits of Visible and Infrared Sensor Arrays" (Committee on Developments in Detector Technologies; National Research Council), 2010, p. 25). Thus, even in the dark without moonlight, etc., the airglow can be constantly used in the wavelength band of 1450 to 1800 nm.

Provided on a surface of a light transmitter, such as a lens, used for an imaging optical system, in order to reduce the reflectance, is an antireflection film as a multilayer film in which a plurality of dielectric thin films are laminated by the evaporation. Using for the top layer of the antireflection film a material having a refractive index lower than a refractive index of 1.38 of magnesium fluoride used in the evaporated film can provide a a high-performance antireflection function. The known material having a low refractive index uses an inorganic material such as silica or magnesium fluoride, or an organic material such as silicone resin or amorphous fluoro-resin. These materials can lower the refractive index by forming voids in the layer. Reducing the reflectance of the lens in the wavelength band of 1450 to 1800 nm can increase a light transmitting amount in this wavelength band and provide more image information.

Figure 1:
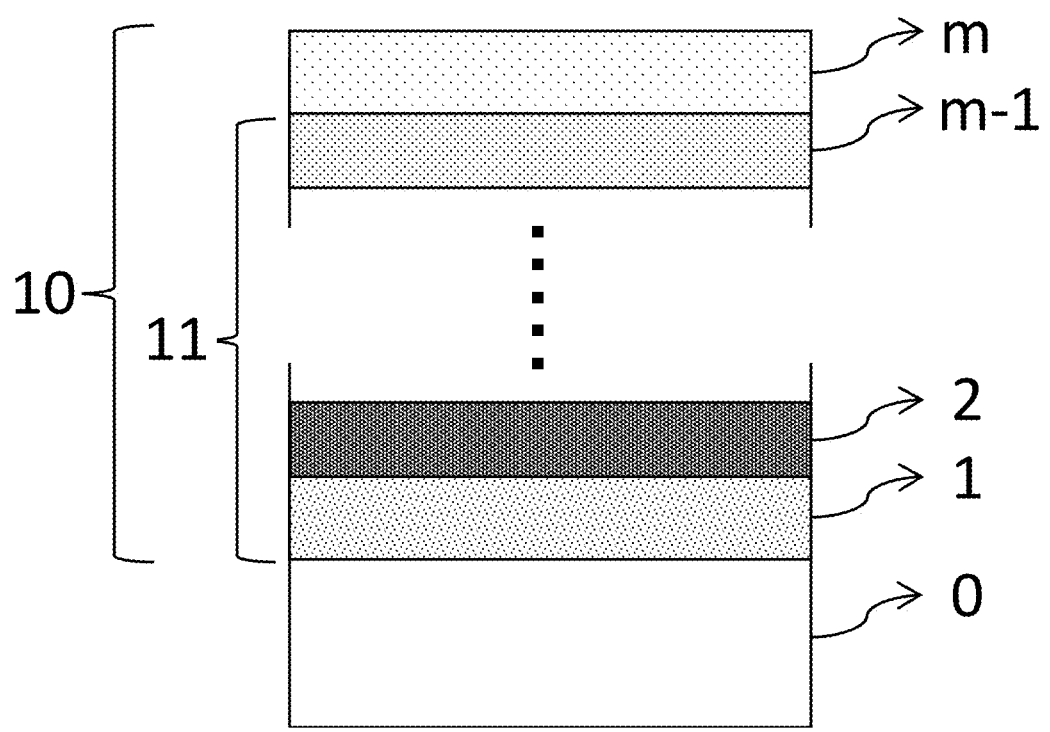
FIG. 1 is a sectional view illustrating of an antireflection film according to a representative embodiment of the present invention.

Referring now to FIG. 1, a description will be given of an antireflection film according to a representative embodiment of the present invention. FIG. 1 is a sectional view of an antireflection film 10 as a multilayer film provided on an optical element, such as a lens, according to a representative example. The antireflection film 10 is provided on a surface of a substrate 0 as a main body of the optical element (optical element body, such as a lens portion as a light transmitter). The antireflection film 10 is a multilayer film with m layers (equal to or larger than 2) and includes one or more base (or foundation) layers or underlayers 11 composed of a thin film layer 1 at a first layer to a thin layer m−1 at a (m−1)-th layer from the substrate side, and a top or uppermost layer m on an m-th layer. The top layer m is most distant from the substrate, forms an interface with air, and is a refractive index layer lower than that of any one of the thin layer 1 to the thin film layer m−1. Where nm is a refractive index of the top layer m for a wavelength λ (430≤λ≤1800) (nm), a condition of 1.10≤$n_m$≤1.30 is satisfied.

According to Seichu LI, "Optical Thin Film and Deposition Technology," Agne Gijutsu Center, (2002), in a thin film calculation using of the optical admittance and the characteristic matrix, two interfaces between an incident medium and a thin film layer and between a thin film layer and a substrate can be attributed to one interface expressed by the equivalent optical admittance.

Figure 2A:
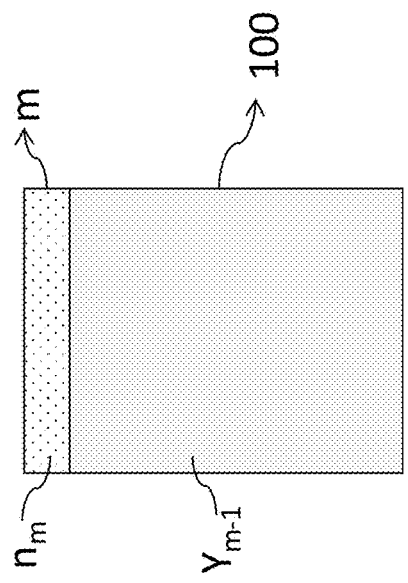
FIGS. 2A to 2C explain an equivalent optical admittance of a thin film layer according to the representative embodiment.

The optical admittance is a ratio of an electric field in the medium and a magnetic field strength, and can be handled equivalently to the refractive index of the medium where $Y0=\sqrt{(\varepsilon 0/\mu 0)}$ is set to a unit as a value in vacuum. For example, as illustrated in FIG. 2A, assume that light is perpendicularly incident on an interface $r_{0-1}$ between the substrate 0 and the thin film layer 1 and an interface $r_{1-2}$ between the thin film layers 1 and 2. Then, Et and Ht are the electric field and the magnetic field strength at the interface $r_{0-1}$ respectively, and Ei and Hi are the electric field and the magnetic field strength at the interface $r_{1-2}$ respectively. Since the optical admittance of the thin film layer 1 is equivalent to the refractive index $n_1$ of the thin film layer 1, the relationship among Et, Ht, Ei, and Hi at the interfaces $r_{0-1}$ and $r_{1-2}$ in the thin film layer 1 is expressed by the following equation (1):

$$\begin{bmatrix} Ei \\ Hi \end{bmatrix} = \begin{bmatrix} \cos\delta_1 & \frac{i}{n_1}\sin\delta_1 \\ in_1\sin\delta_1 & \cos\delta_1 \end{bmatrix} \begin{bmatrix} Et \\ Ht \end{bmatrix} \quad (1)$$

A phase difference $\delta_1$ of the thin film layer 1 is expressed by the following expression (2), where $d_1$ is a film thickness of the thin film layer 1 and $n_1$ is a refractive index of the thin film layer 1 for the wavelength λ of the incident light:

$$\delta_1 = 2\pi n_1 d_1/\lambda \quad (2)$$

Figure 2B:
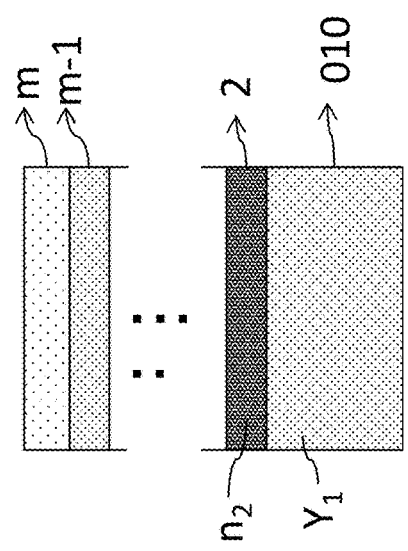
Figure 2C:
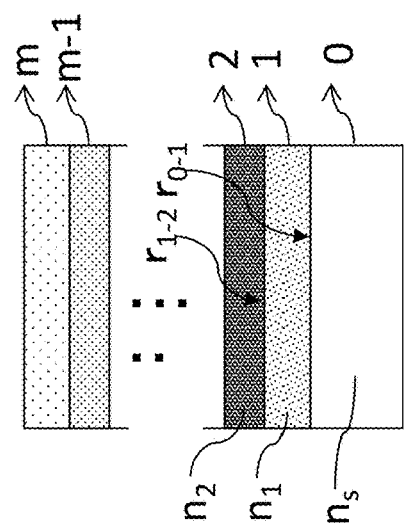

The expression (1) can be expressed by the following equation (3) and the optical admittance $Yt=Et/Ht=n_s$ of the substrate 0:

$$\begin{bmatrix} B_1 \\ C_1 \end{bmatrix} = \begin{bmatrix} \cos\delta_1 & \frac{i}{n_1}\sin\delta_1 \\ in_1\sin\delta_1 & \cos\delta_1 \end{bmatrix} \begin{bmatrix} 1 \\ Yt \end{bmatrix} \quad (3)$$

Where $Y_1=C_1/B_1$, $Y_1$ is the equivalent optical admittance of the substrate 0 and the thin film layer 1 calculated from the interfaces $r_{0-1}$ and $r_{1-2}$ and the thin film layer 1. In other words, the configuration of FIG. 2A is equal to that illustrated in FIG. 2B, the substrate 0 and the thin film layer 1 can be treated as a virtual layer 010 of the equivalent refractive index $Y_1$. When this procedure is repeated (m−1) times, the substrate 0 and the base layer 11 can simply be expressed as the virtual layer 100 of the equivalent refractive index $Y_{m-1}$ and the configuration in FIG. 2A is the same as that of FIG. 2C. The equivalent optical admittance $Y_{m-1}$ is expressed by the following expression (4) with the refractive index $n_j$ (j=1 to m−1) and the phase difference $\delta_j$ (j=1 to m−1) in the thin film layer as the base layer 11.

$$\begin{bmatrix} B_{m-1} \\ C_{m-1} \end{bmatrix} = \prod_{j=1}^{m-1} \begin{bmatrix} \cos\delta_j & \frac{i}{n_j}\sin\delta_j \\ in_j\sin\delta_j & \cos\delta_j \end{bmatrix} \begin{bmatrix} 1 \\ Yt \end{bmatrix} \quad (4)$$

In the equation (4), $Y_{m-1}=C_{m-1}/B_{m-1}$.

From the expression (4), the equivalent optical admittance $Y_m=C_m/B_m$ from the substrate 0 to the top layer m is expressed by the following equation (5).

$$\begin{bmatrix} B_m \\ C_m \end{bmatrix} = \begin{bmatrix} \cos\delta_m & \frac{i}{n_m}\sin\delta_m \\ in_m\sin\delta_m & \cos\delta_m \end{bmatrix} \begin{bmatrix} 1 \\ Y_{m-1} \end{bmatrix} \quad (5)$$

Air has a refractive index of 1, and the reflectance at the interface between the top layer m and air is 0 when the following expression (6) is met.

$$Y_m = C_m/B_m = 1 \quad (6)$$

Herein, the equivalent optical admittance $Y_{m-1}(\lambda)$ at the wavelength of the incident light (also referred to as an incident wavelength hereinafter) λ is expressed as $Y_{m-1}(\lambda)=a+ib$ in the complex representation. The trajectory of the complex coordinate (a, b) where the reflectance at the interface between the top layer m and air is 0 draws a circle with a center $((n_m^2+1)/2, 0)$ and a radius of $(n_m^2-1)/2$ based on expressions (5) and (6). A position (point) of the complex coordinate (a, b) is uniquely determined based on the incident wavelength λ and the film thickness $d_m$ of the top layer m. For example, if the top layer m has a refractive index of 1.25, the trajectory of the complex coordinate (a, b) draws a circle with a center located at (1.28, 0) and a radius of 0.28. In order to reduce the reflectance of the antireflection film 10 down to about 0%, the base layer 11 may be formed so that the complex coordinate (a, b) may have a value on this circle close to a position uniquely determined by the incident wavelength λ and the film thickness $d_m$ of the top layer m.

Characteristically, the antireflection film 10 has a high antireflection performance in the visible region (430 to 700 nm) and the wavelength band of 1450 to 1800 nm in which the airglow is available. In order to realize this characteristic, the complex coordinate (a, b) of the equivalent optical admittance from the substrate 0 to the base layer 11 (also simply referred to as "the optical admittance of the underlying layer 11" hereinafter) satisfies the following conditional expression (7) to (9):

$$\text{When } \lambda=430, (a-1.25)^2+(b-0.28)^2 \leq 0.45^2 \quad (7)$$

$$\text{When } \lambda=1000, (a-1.34)^2+(b+0.28)^2 \geq 0.30^2 \quad (8)$$

$$\text{When } \lambda=1800, (a-1.14)^2+(b+0.24)^2 \leq 0.30^2 \quad (9)$$

As described above, the reflectance is reduced when the complex coordinate (a, b) is located near the point on a circle uniquely determined by the incident wavelength λ, the refractive index $n_m$ of the top layer m, and the film thickness $d_m$. In other words, in the visible region 430 to 700 $n_m$ and the wavelength band of 1450 to 1800 nm, the complex coordinate (a, b) should be located near the unique point on the circle. Since the material of the base layer 11 is limited, the reflections in the two bands can be further reduced by removing a band around 1000 nm for which it is unnecessary to reduce the reflectance, from the uniquely determined point on the circle or positions near the point.

The film configuration that satisfies the conditional expressions (7) to (9) can be produced with common materials, and realize the low reflectance in the visible region of 430 to 700 nm and the wavelength band of 1450 to 1800 nm.

The complex coordinate (a, b) of the equivalent optical admittance from the substrate 0 to the base layer 11 may satisfy the following conditional expressions (10) and (11):

$$\text{When } \lambda=430, (a-1.25)^2+(b-0.28)^2 \leq 0.41^2 \quad (10)$$

$$\text{When } \lambda=1800, (a-1.14)^2+(b+0.24)^2 \leq 0.20^2 \quad (11)$$

The complex coordinate (a, b) of the equivalent optical admittance from the substrate 0 to the base layer 11 may satisfy the following conditional expression (12) in the range of 430≤λ≤700 or 1450≤λ≤1800:

$$(a-1.28)^2+(b)^2 \leq 0.55^2 \quad (12)$$

The following conditional expression (13) may be satisfied in the range of 900≤λ≤1100:

$$(a-1.30)^2+(b+0.28)^2 \geq 0.25^2 \quad (13)$$

The film thickness $d_m$ (nm) of the top layer m may satisfy the following conditional expression (14):

$$125 \leq n_m d_m \leq 250 \quad (14)$$

In general, the reflectance becomes minimum when the optical film thickness of the thin film on the substrate is a quarter of a used wavelength (incident wavelength) λ. Since the wavelength band used for this embodiment is a wide range from 430 to 1800 nm, a low reflectance can be obtained when one quarter of the optical film thickness is near a reciprocal of a midpoint of the reciprocal of this wavelength band. According to this embodiment, where 430≤λ≤700 or 1450≤λ≤1800, the reflectance of the antireflection film 10 may be 1.0% or less for a light ray with an incident angle on the antireflection film 10 of 00 to 15° inclusive. According to this embodiment, the antireflection film 10 may have 7 layers or more. When the antireflection film 10 (including all layers with the base layer 11 and the top layer m) has 6 layers or less, it is difficult to improve the reflection preventive performance.

The base layer 11 includes a plurality of layers made of different materials, and the following conditional expression (15) may be satisfied where $n_H$ is the highest refractive index in the materials in the base layer 11, and $n_L$ is the lowest refractive index in the materials in the lowest refractive index:

$$0.4 \leq n_H - n_L \leq 0.9 \quad (15)$$

This is because a larger refractive index difference between the respective materials is likely to realize a low reflection in a wide band.

The top layer m is made of an inorganic material, such as silica (silicon oxide $SiO_2$) or magnesium fluoride ($MgF_2$), or an organic material, such as silicon resin or amorphous fluoro-resin, and has a void in the layer. Air (refractive index of 1.0) contained in the internal void reduces the refractive index. Further, the top layer m may be a film formed by coupling hollow fine particles or solid fine particles with one another by the binder. The main material of these fine particles may have a low refractive index, such as $SiO_2$ or $MgF_2$, in order to lower the refractive index.

The layer in the base layer 11 may contain oxide of titanium, tantalum, zirconium, chromium, niobium, cerium, hafnium, aluminum, silicon, and yttrium singularly or in mixture. The material of the thin film layer 1 as the first layer in the base layer 11 may be $Al_2O_3$, $SiN_X$, SiON, or $Nb_2O_5$ so as to prevent fogs etc.

The film formation method of the top layer m does not need to couple fine particles with each other by the binder and may use a sol-gel method. The coating method is not particularly limited and may use a general coating method of a liquid coating liquid such as a dip coating method, a spin coating method, a spray coating method, and a roll coating method. The spin coating of the coating material may be used so as to form a film with a uniform thickness on the substrate 0 having a curved surface, such as a lens.

Drying follows coating. The drying can use a dryer, a hot plate, an electric furnace or the like. A drying condition does not affect the substrate 0, and sets the temperature and time enough to evaporate the organic solvent in and between fine particles. In general, a temperature of 300° C. or lower may be used. Although the coating number may be usually once, the drying and coating may be repeated several times. The base layer 11 may be formed by a dry method, such as the vacuum evaporation method and the sputtering method, for a simple film formation.

Specific examples of the present invention will now be described. However, they are merely illustrative, and the examples of the present invention are not limited to these conditions.

Examples 1 to 3

The antireflection film 10 according to Examples 1 to 3 includes a multilayer film having thirteen layers. In Examples 1 to 3, the substrate 0 has a different refractive index from each other, but the material of the thin film in the antireflection film 10 is the same.

Table 1 shows the film configuration and the refractive index for the d-line according to Examples 1 to 3 (587.6 nm). The base layer 11 includes the first layer to the twelfth layer, and is formed by the vacuum evaporation method. The top layer is the thirteenth layer and prepared by adding a binder solution to a solution containing hollow $SiO_2$, by coating the layer with the mixed and prepared liquid by a spin coater, and by sintering it for one hour in a clean oven at 100 to 250° C. The thus produced top layer is prepared to have a refractive index of 1.25 for the d-line in all of Examples 1 to 3.

Figure 3:
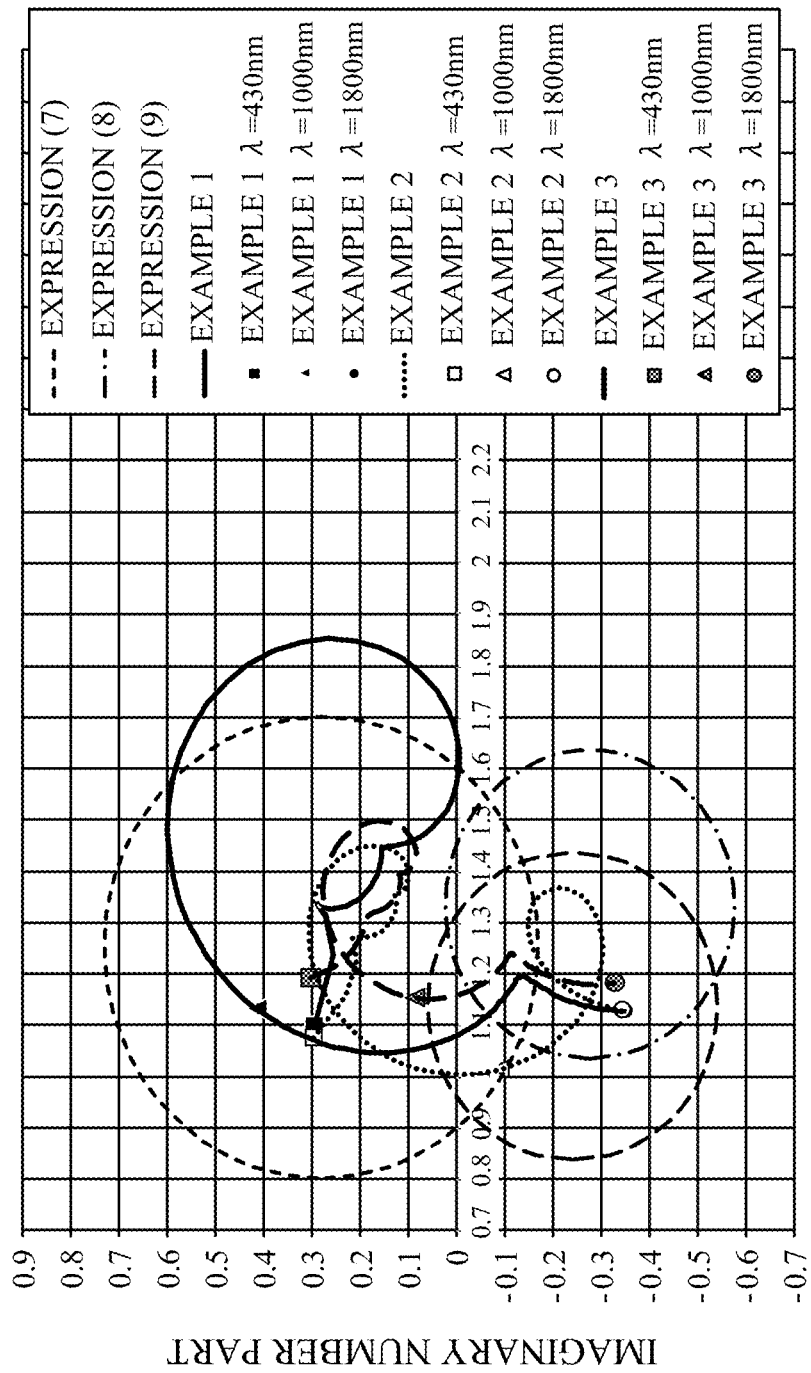
FIG. 3 illustrates complex coordinates of optical admittances according to Examples 1 to 3.

FIG. 3 illustrates complex coordinates of the optical admittances in the base layer 11 (equivalent optical admittances from the substrate 0 to the base layer 11) according to Examples 1 to 3. In FIG. 3, the abscissa axis represents a real number part "a" in Y=a+ib, and the ordinate axis represents an imaginary number part "b." In FIG. 3, the conditional expression (7) is expressed by a short broken line, the conditional expression (8) is expressed by an alternate long and short dash line, and the conditional expression (9) is expressed by a long broken line. When the conditional expressions (7) and (9) are located inside the circle and the conditional expression (8) is located outside the circle, the respective conditions are satisfied. This will be true of the following other examples.

FIG. 3 illustrates, through a solid line, a short broken line, and a long broken line, the trajectories of the complex coordinates of the equivalent optical admittances according to Examples 1 to 3 in which the incident wavelength λ is 430 to 1800 nm. The complex coordinate when λ=430 nm is illustrated as a square point, the complex coordinate when λ=1000 nm is illustrated as a triangular point, and the complex coordinate when λ=1800 nm is illustrated as a round point, and Examples 1 to 3 are classified by white, black, and gray. It can be confirmed from FIG. 3 that the square point indicating the equivalent optical admittance when λ=430 nm is located inside the circle surrounded by the short broken line representing the conditional expression (7). It is also confirmed that the triangular point indicating the equivalent optical admittance when λ=1000 nm is located outside the circle surrounded by the alternate long and short dash line representing the conditional expression (8) and the round point illustrating the equivalent optical admittance when λ=1800 nm is located inside the circle surrounded by a long broken line representing the conditional expression (9).

Figure 4:
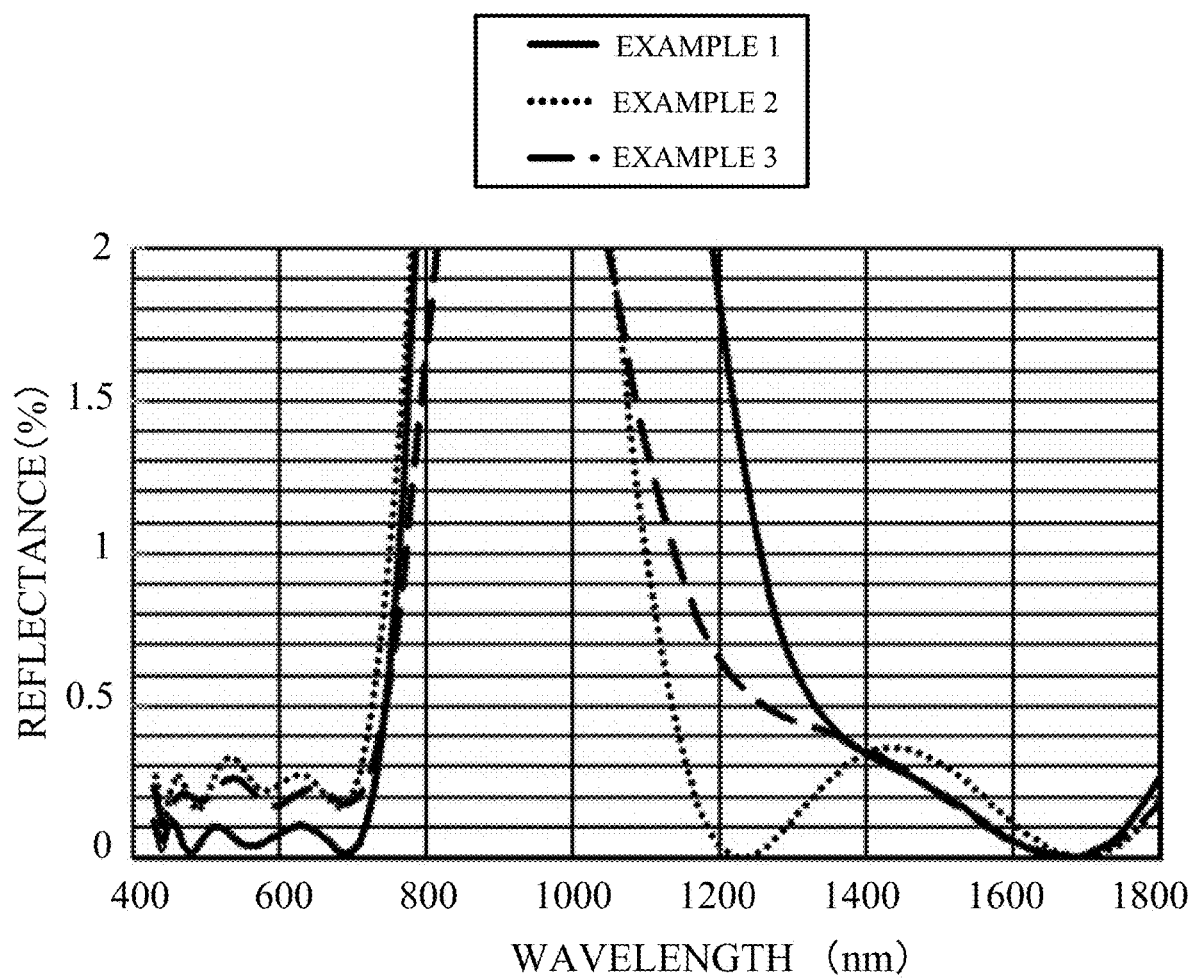
FIG. 4 illustrates reflectance characteristics according to Examples 1 to 3.

FIG. 4 illustrates the reflectance when the incident angle is 00 in the wavelength band of 430 to 1800 nm in Examples 1 to 3. A solid line represents the reflectance in Example 1, a short broken line represents the reflectance in Example 2, and a long broken line represents the reflectance in Example 3. It is confirmed from FIG. 4 that the reflectance in the visible region (430 to 700 nm) and the wavelength band of 1450 to 1800 nm is 0.4% or less according to Examples 1 to 3, and a high antireflection performance can be obtained.

TABLE 1

| | Material | Refractive index | | Example 1 | Example 2 | Example 3 |
|---|---|---|---|---|---|---|
| 13th layer | Hollow SiO$_2$ | 1.25 | Physical film thickness (nm) | 134.5 | 148.0 | 141.5 |
| 12th layer | Ta$_2$O$_5$ | 2.30 | | 8.1 | 3.9 | 4.8 |
| 11th layer | SiO$_2$ | 1.46 | | 59.3 | 117.7 | 118.7 |
| 10th layer | Ta$_2$O$_5$ | 2.30 | | 5.6 | 15.3 | 15.9 |
| 9th layer | SiO$_2$ | 1.46 | | 61.0 | 21.4 | 44.5 |
| 8th layer | Ta$_2$O$_5$ | 2.30 | | 21.2 | 13.4 | 33.3 |
| 7th layer | SiO$_2$ | 1.46 | | 41.1 | 16.0 | 12.1 |
| 6th layer | Ta$_2$O$_5$ | 2.30 | | 156.4 | 264.5 | 241.6 |
| 5th layer | SiO$_2$ | 1.46 | | 28.5 | 19.0 | 0.5 |
| 4th layer | Ta$_2$O$_5$ | 2.30 | | 42.1 | 35.2 | 0.5 |
| 3rd layer | SiO$_2$ | 1.46 | | 40.8 | 33.8 | 5.4 |
| 2nd layer | Ta$_2$O$_5$ | 2.30 | | 25.6 | 15.4 | 26.6 |
| 1st layer | Al$_2$O$_3$ | 1.63 | | 113.9 | 10.0 | 0.5 |
| | Substrate | Refractive index | | 1.50 | 1.80 | 2.10 |

Examples 4 to 6

The antireflection film 10 according to Examples 4 to 6 has a multilayer film with thirteen layers. In Examples 4 to 6, the substrate 0 has a different refractive index, but the material of the thin film in the antireflection film 10 is the same.

Table 2 shows the film configuration and the refractive index for the d-line according to Examples 4 to 6 (587.6 nm). The base layer 11 includes the first layer to the twelfth layer, and is formed by the vacuum evaporation method. The top layer is the thirteenth layer and prepared by adding a binder solution to a solution containing hollow SiO$_2$, by coating the layer with the mixed and prepared liquid by a spin coater, and by sintering the layer for one hour in a clean oven at 100 to 250° C. The thus produced top layer is prepared to have a refractive index of 1.25 for the d-line in all of Examples 4 to 6.

Figure 5:
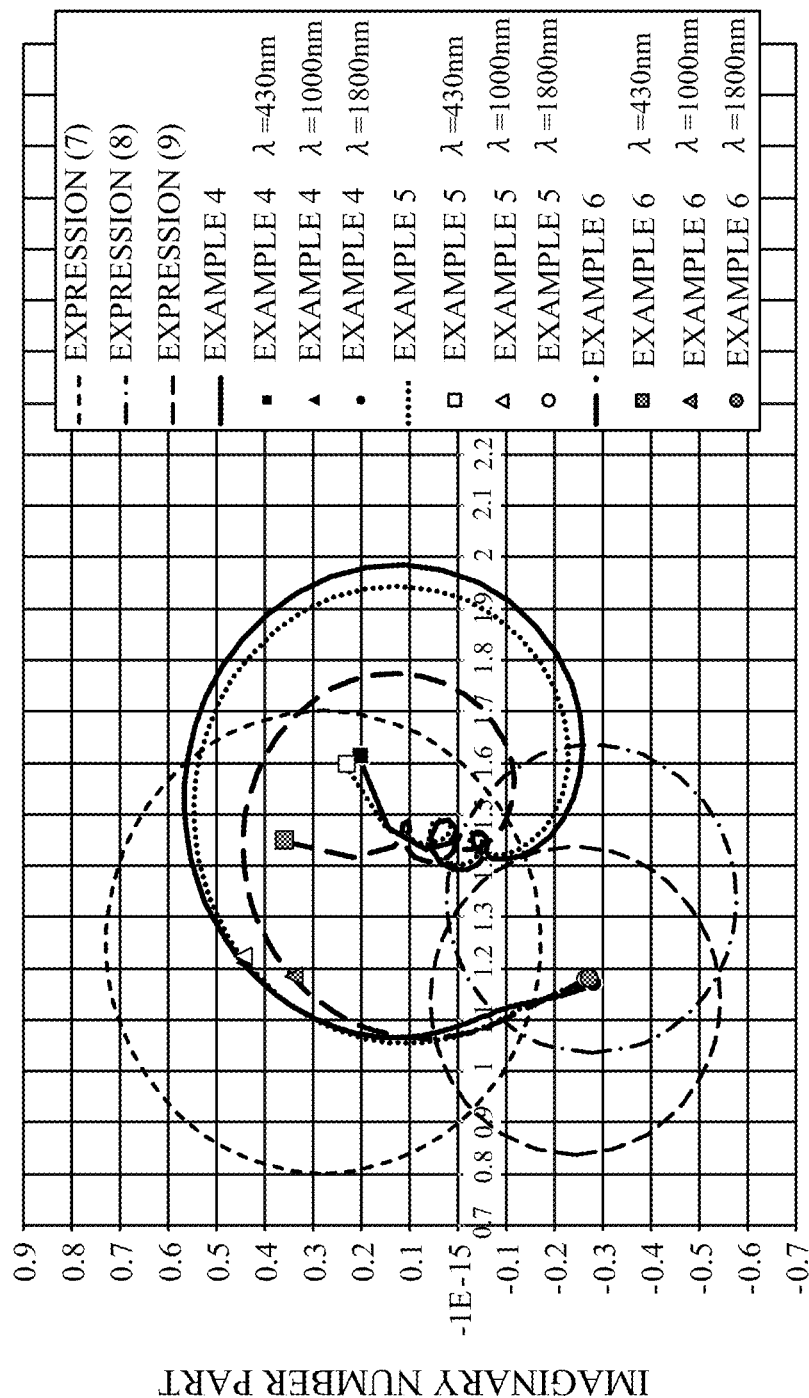
FIG. 5 illustrates complex coordinates of optical admittance according to Examples 4 to 6.

FIG. 5 illustrates complex coordinates of optical admittances in the base layer 11 (equivalent optical admittances from the substrate 0 to the base layer 11) according to Examples 4 to 6. In FIG. 5, the abscissa axis represents a real number part "a" in Y=a+ib, and the ordinate axis represents an imaginary number part "b." In FIG. 5, the conditional expression (7) is expressed by a short broken line, the conditional expression (8) is expressed by an alternate long and short dash line, and the conditional expression (9) is expressed by a long broken line.

FIG. 5 illustrates, through a solid line, a short broken line, and a long broken line, the trajectories of the complex coordinates of the equivalent optical admittances according to Examples 4 to 6 in which the incident wavelength λ is 430 to 1800 nm. The complex coordinate when λ=430 nm is illustrated as a square point, the complex coordinate when λ=1000 nm is illustrated as a triangular point, and the complex coordinate when λ=1800 nm is illustrated as a round point, and Examples 4 to 6 are classified by white, black, and gray. It can be confirmed from FIG. 5 that the square point indicating the equivalent optical admittance with λ=430 nm is located inside the circle surrounded by the short broken line representing the conditional expression (7). It is also confirmed that the triangle point indicating the equivalent optical admittance with λ=1000 nm is located outside the circle surrounded by the alternate long and short dash line representing the conditional expression (8), and the round point illustrating the equivalent optical admittance when λ=1800 nm is located inside the circle surrounded by a long broken line representing the conditional expression (9).

Figure 6:
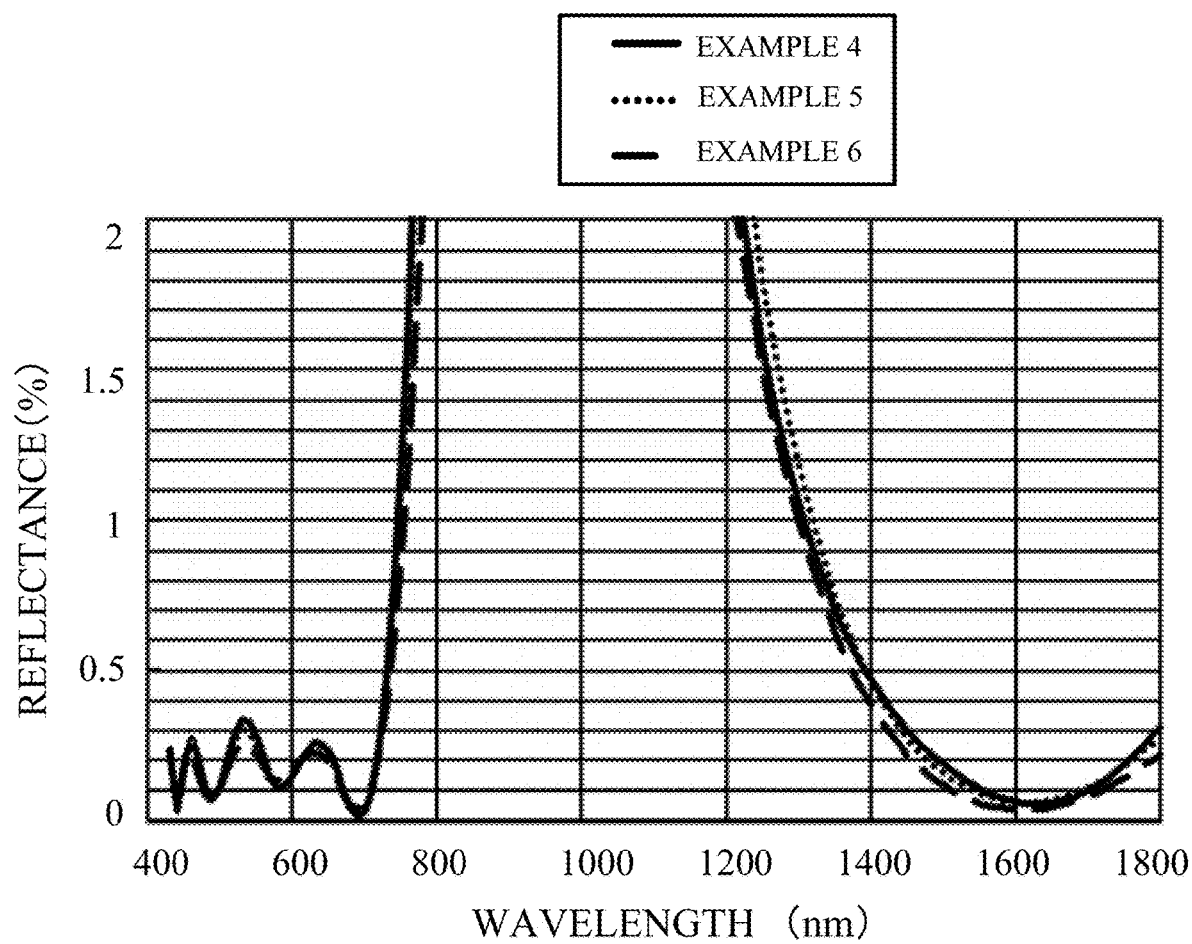
FIG. 6 illustrates reflectance characteristics according to Examples 4 to 6.

FIG. 6 illustrates the reflectance when the incident angle is 00 in the wavelength band of 430 to 1800 nm in Examples 4 to 6. A solid line represents the reflectance in Example 4, a short broken line represents the reflectance in Example 5, and a long broken line represents the reflectance in Example 6. It is confirmed from FIG. 6 that the reflectance in the visible region (430 to 700 nm) and the wavelength band of 1450 to 1800 nm is 0.4% or less according to Examples 4 to 6, and a high antireflection performance can be obtained.

TABLE 2

| | Material | Refractive index | | Example 4 | Example 5 | Example 6 |
|---|---|---|---|---|---|---|
| 13th layer | Hollow SiO$_2$ | 1.25 | Physical film thickness (nm) | 105.5 | 106.8 | 115.8 |
| 12th layer | SiO$_2$ | 1.46 | | 192.7 | 184.7 | 174.3 |
| 11th layer | Ta$_2$O$_5$ | 2.30 | | 5.0 | 5.0 | 5.0 |
| 10th layer | SiO$_2$ | 1.46 | | 53.1 | 51.6 | 29.4 |
| 9th layer | Ta$_2$O$_5$ | 2.30 | | 21.2 | 21.8 | 15.1 |
| 8th layer | SiO$_2$ | 1.46 | | 38.1 | 33.5 | 36.9 |

TABLE 2-continued

|  | Material | Refractive index | Example 4 | Example 5 | Example 6 |
|---|---|---|---|---|---|
| 7th layer | $Ta_2O_5$ | 2.30 | 38.0 | 48.6 | 56.1 |
| 6th layer | $SiO_2$ | 1.46 | 52.6 | 36.8 | 19.7 |
| 5th layer | $Ta_2O_5$ | 2.30 | 22.9 | 36.7 | 57.2 |
| 4th layer | $SiO_2$ | 1.46 | 83.2 | 52.2 | 26.0 |
| 3rd layer | $Ta_2O_5$ | 2.30 | 17.8 | 35.2 | 54.9 |
| 2nd layer | $SiO_2$ | 1.46 | 73.0 | 39.5 | 15.7 |
| 1st layer | $Ta_2O_5$ | 2.30 | 10.7 | 21.8 | 39.4 |
|  | Substrate | Refractive index | 1.50 | 1.80 | 2.10 |

Examples 7 to 9

The antireflection film 10 according to Examples 7 to 9 has a multilayer film with thirteen layers. In Examples 7 to 9, the top layer has a different refractive index, but the material of the thin film other than the top layer in the antireflection film 10 and the refractive index of the substrate 0 are the same.

Table 3 shows the film configuration and the refractive index for the d-line according to Examples 7 to 9 (587.6 nm). The base layer 11 includes the first layer to the twelfth layer and is formed by the vacuum deposition method. The top layer is the thirteenth layer and prepared by adding a binder solution to a solution containing hollow $SiO_2$, by coating the layer with the mixed and prepared liquid by a spin coater, and by sintering the layer for one hour in a clean oven at 100 to 250° C. The top layer of each of Examples 7 to 9 is prepared to have a refractive index as shown in Table 3.

Figure 7:
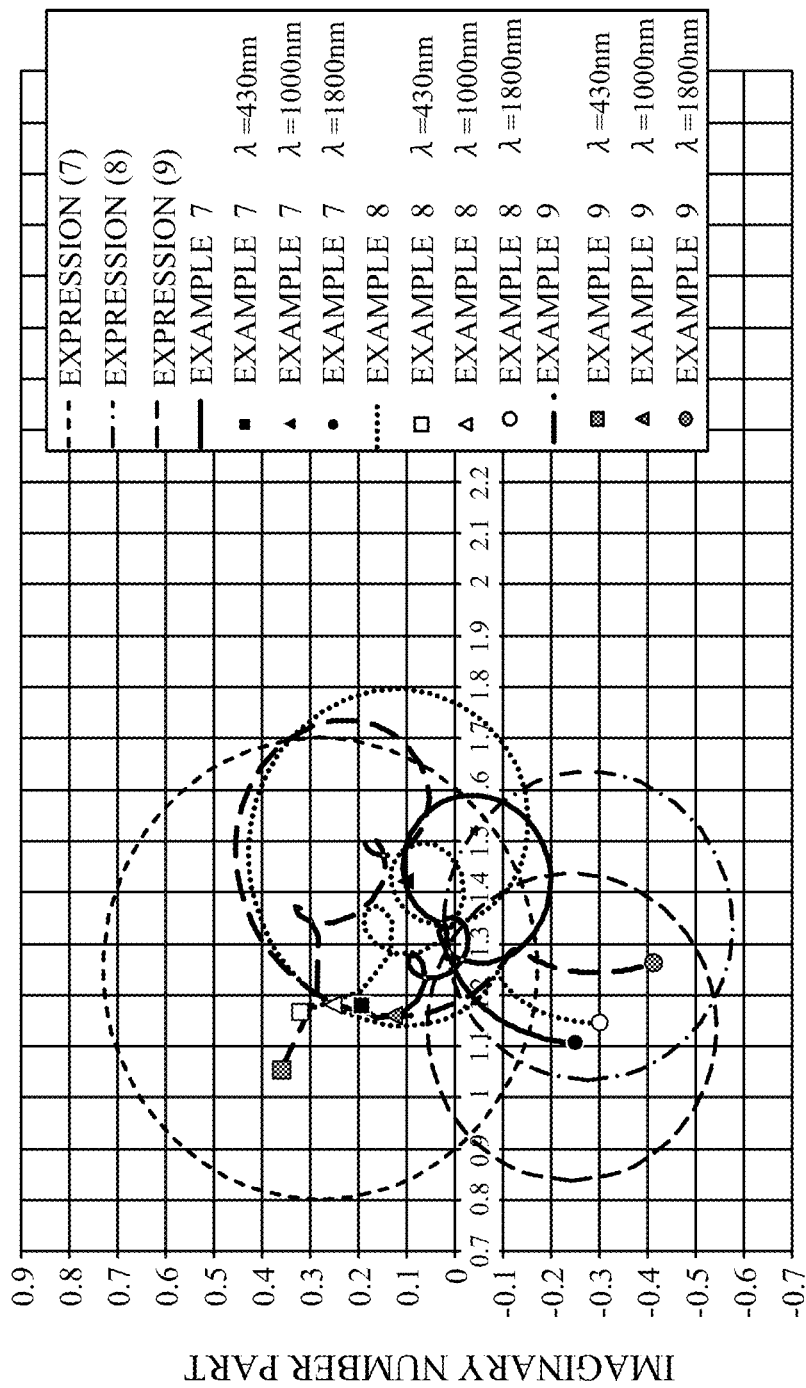
FIG. 7 illustrate complex coordinates of optical admittances according to Examples 7 to 9.

FIG. 7 illustrates complex coordinates of optical admittances in the base layer 11 (equivalent optical admittances from the substrate 0 to the base layer 11) according to Examples 7 to 9. In FIG. 7, the abscissa axis represents a real number part "a" in Y=a+ib, and the ordinate axis represents an imaginary number part "b." In FIG. 7, the conditional expression (7) is expressed by a short broken line, the conditional expression (8) is expressed by an alternate long and short dash line, and the conditional expression (9) is expressed by a long broken line.

FIG. 7 illustrates, a solid line, a short broken line, and a long broken line, the trajectories of the complex coordinates of the equivalent optical admittances according to Examples 7 to 9 in which the incident wavelength λ is 430 to 1800 nm. The complex coordinate when λ=430 nm is illustrated as a square point, the complex coordinate when λ=1000 nm is illustrated as a triangular point, and the complex coordinate when λ=1800 nm is illustrated as a round point, and Examples 7 to 9 are classified by white, black, and gray. It can be confirmed from FIG. 7 that the square point indicating the equivalent optical admittance when λ=430 nm is located inside the circle surrounded by the short broken line representing the conditional expression (7). It is also confirmed that the triangle point indicating the equivalent optical admittance when λ=1000 nm is located outside the circle surrounded by the alternate long and short dash line representing the conditional expression (8) and the round point illustrating the equivalent optical admittance when λ=1800 nm is located inside the circle surrounded by a long broken line representing the conditional expression (9).

Figure 8:
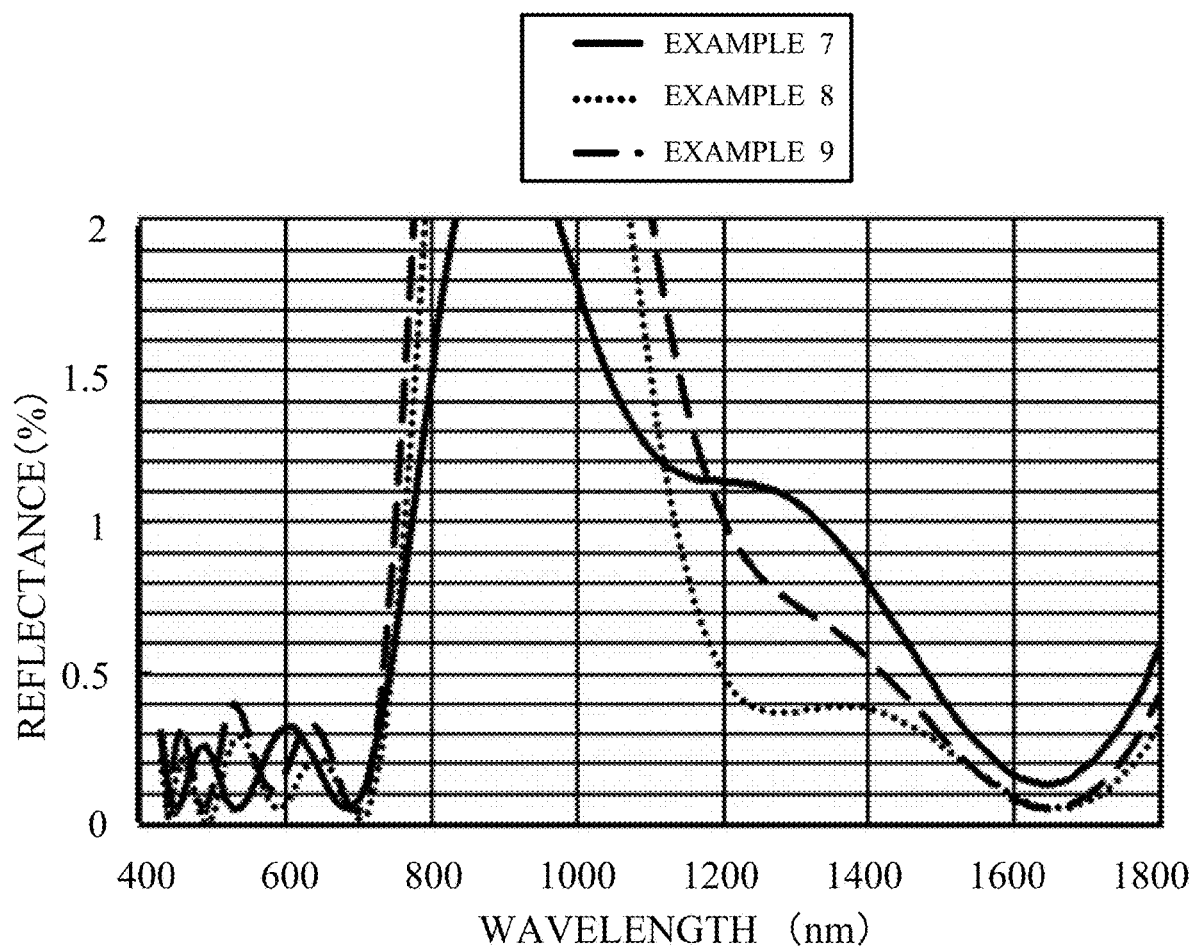
FIG. 8 illustrates reflectance characteristics according to Examples 7 to 9.

FIG. 8 illustrates the reflectance when the incident angle is 00 in the wavelength band of 430 to 1800 nm in Examples 7 to 9. A solid line represents the reflectance in Example 7, a short broken line represents the reflectance in Example 8, and a long broken line represents the reflectance in Example 9. It is confirmed from FIG. 8 that the reflectance in the visible region (430 to 700 nm) is 0.5% or less and the reflectance in the wavelength band of 1450 to 1800 nm according to Examples 7 to 9 is 0.7% or less, and a high antireflection performance can be obtained.

TABLE 3

|  | Material | Refractive index |  | Example 7 | Example 8 | Example 9 |
|---|---|---|---|---|---|---|
| 13th layer | Hollow $SiO_2$ |  | Refractive index | 1.10 | 1.20 | 1.30 |
|  |  |  | Physical film thickness (nm) | 146.9 | 132.8 | 136.1 |
| 12th layer | $Ta_2O_5$ | 2.30 |  | 2.7 | 5.0 | 5.0 |
| 11th layer | $SiO_2$ | 1.46 |  | 117.2 | 93.8 | 20.7 |
| 10th layer | $Ta_2O_5$ | 2.30 |  | 18.0 | 10.7 | 7.7 |
| 9th layer | $SiO_2$ | 1.46 |  | 56.0 | 55.1 | 81.3 |
| 8th layer | $Ta_2O_5$ | 2.30 |  | 33.5 | 24.6 | 25.4 |
| 7th layer | $SiO_2$ | 1.46 |  | 24.3 | 28.1 | 37.8 |
| 6th layer | $Ta_2O_5$ | 2.30 |  | 168.2 | 163.8 | 167.6 |
| 5th layer | $SiO_2$ | 1.46 |  | 12.4 | 12.1 | 13.2 |
| 4th layer | $Ta_2O_5$ | 2.30 |  | 52.1 | 62.8 | 62.2 |
| 3rd layer | $SiO_2$ | 1.46 |  | 210.1 | 14.9 | 18.2 |
| 2nd layer | $Ta_2O_5$ | 2.30 |  | 29.7 | 38.6 | 34.7 |
| 1st layer | $Al_2O_3$ | 1.63 |  | 5.0 | 5.0 | 5.0 |
|  | Substrate |  | Refractive index | 1.90 | 1.90 | 1.90 |

Examples 10 to 12

The antireflection film 10 according to Examples 10 to 12 has a multilayer film with fourteen layers. In Examples 10 to 12, the top layer has a different refractive index, but the material of the thin film other than the top layer in the antireflection film 10 and the refractive index of the substrate 0 are the same.

Table 4 shows the film configuration and the refractive index for the d-line according to Examples 10 to 12 (587.6 nm). The base layer 11 includes the first layer to the twelfth layer and is formed by the vacuum evaporation method. The top layer is the fourteenth layer and prepared by adding a binder solution to a solution containing hollow $SiO_2$, by coating the layer with the mixed and prepared liquid by a spin coater, and by sintering the layer for one hour in a clean oven at 100 to 250° C. The top layer of each of Examples 10 to 12 is prepared to have a refractive index as shown in Table 4.

Figure 9:
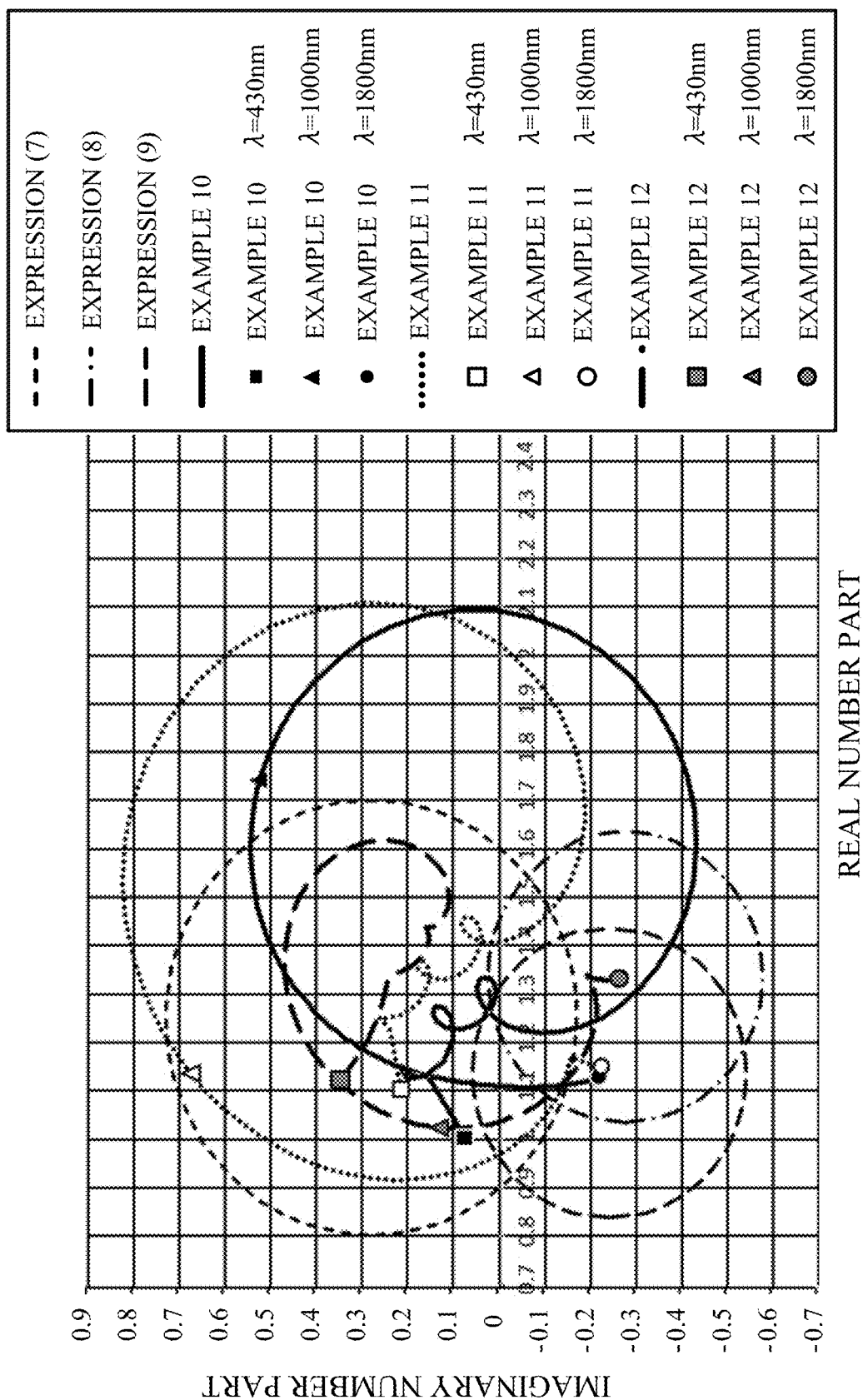
FIG. 9 illustrates complex coordinates of optical admittances according to Examples 10 to 12.

FIG. 9 illustrates complex coordinates of optical admittances in the base layer 11 (equivalent optical admittance from the substrate 0 to the base layer 11) according to Examples 10 to 12. In FIG. 9, the abscissa axis represents a real number part "a" in Y=a+ib, and the ordinate axis represents an imaginary number part "b." In FIG. 9, the conditional expression (7) is expressed by a short broken line, the conditional expression (8) is expressed by an alternate long and short dash line, and the conditional expression (9) is expressed by a long broken line.

FIG. 9 illustrates, through a solid line, a short broken line, and a long broken line, the trajectories of the complex coordinates of the equivalent optical admittances according to Examples 10 to 12 in which the incident wavelength λ is 430 to 1800 nm. The complex coordinate when λ=430 nm is illustrated as a square point, the complex coordinate when λ=1000 nm is illustrated as a triangular point, and the complex coordinate when λ=1800 nm is illustrated as a round point, and Examples 10 to 12 are classified by white, black, and gray. It can be confirmed from FIG. 9 that the square point indicating the equivalent optical admittance when λ=430 nm is located inside the circle surrounded by the short broken line representing the conditional expression (7). It is also confirmed that the triangle point indicating the equivalent optical admittance with λ=1000 nm is located outside the circle surrounded by the alternate long and short dash line representing the conditional expression (8), and the round point illustrating the equivalent optical admittance with λ=1800 nm is located inside the circle surrounded by a long broken line representing the conditional expression (9).

Figure 10:
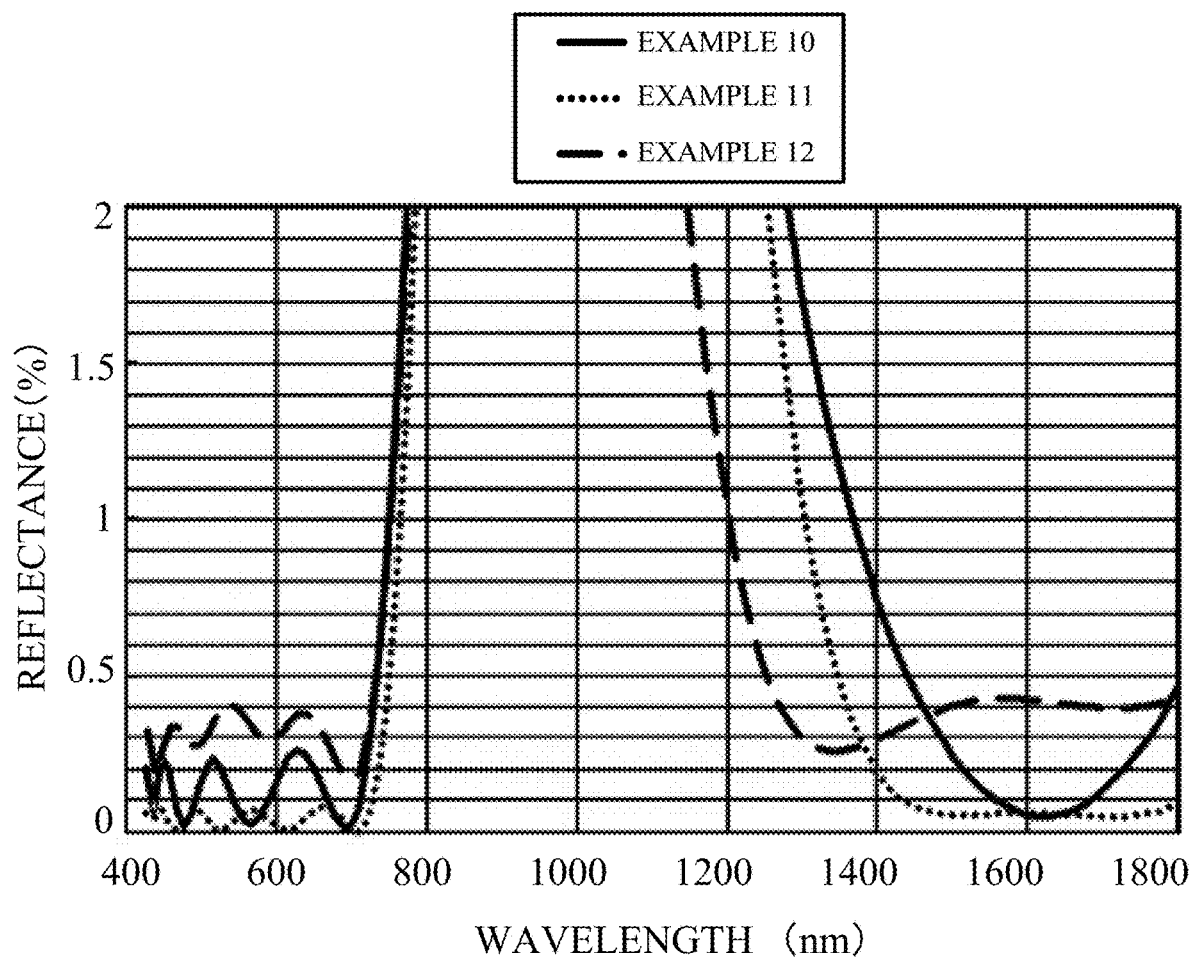
FIG. 10 illustrates reflectance characteristics according to Examples 10 to 12.

FIG. 10 illustrates the reflectance when the incident angle is 00 in the wavelength band of 430 to 1800 nm in Examples 10 to 12. A solid line represents the reflectance in Example 10, a short broken line represents the reflectance in Example 11, and a long broken line represents the reflectance in Example 12. It is confirmed from FIG. 10 that the reflectance in the visible region (430 to 700 nm) is 0.5% or less and the reflectance in the wavelength band of 1450 to 1800 nm according to Examples 10 to 12 is 0.7% or less, and a high antireflection performance can be obtained.

TABLE 4

| | Material | Refractive index | | Example | | |
|---|---|---|---|---|---|---|
| | | | | 10 | 11 | 12 |
| 14th layer | Hollow SiO$_2$ | | Refractive index | 1.10 | 1.20 | 1.30 |
| | | | Physical film thickness (nm) | 147.3 | 137.3 | 141.6 |
| 13th layer | Ta$_2$O$_5$ | 2.30 | | 5.0 | 5.0 | 5.0 |
| 12th layer | SiO$_2$ | 1.46 | | 125.0 | 154.5 | 149.3 |
| 11th layer | Ta$_2$O$_5$ | 2.30 | | 13.4 | 10.5 | 16.3 |
| 10th layer | SiO$_2$ | 1.46 | | 91.3 | 66.5 | 56.0 |
| 9th layer | Ta$_2$O$_5$ | 2.30 | | 27.8 | 45.3 | 42.0 |
| 8th layer | SiO$_2$ | 1.46 | | 40.4 | 19.8 | 44.3 |
| 7th layer | Ta$_2$O$_5$ | 2.30 | | 64.2 | 67.1 | 34.4 |
| 6th layer | SiO$_2$ | 1.46 | | 34.7 | 41.9 | 62.7 |
| 5th layer | Ta$_2$O$_5$ | 2.30 | | 36.2 | 36.2 | 28.0 |
| 4th layer | SiO$_2$ | 1.46 | | 67.5 | 50.6 | 54.6 |
| 3rd layer | Ta$_2$O$_5$ | 2.30 | | 25.6 | 38.6 | 25.3 |
| 2nd layer | SiO$_2$ | 1.46 | | 60.9 | 45.2 | 49.0 |
| 1st layer | Ta$_2$O$_5$ | 2.30 | | 15.4 | 19.2 | 9.9 |
| | Substrate | Refractive index | | 1.60 | 1.60 | 1.60 |

Examples 13 to 16

The antireflection film 10 according to Examples 13 to 16 has a multilayer film with seven to ten layers. In Examples 13 to 16, the materials of the thin films in the antireflection film 10 and the refractive index of the substrate 0 are the same.

Table 5 shows the film configuration and the refractive index for the d-line according to Examples 13 to 16 (587.6 nm). The base layer 11 is a layer other than the top layer and formed by the vacuum evaporation method. The top layer in each Example is prepared by adding a binder solution to a solution containing hollow SiO$_2$, by coating the layer with the mixed and prepared liquid by a spin coater, and by sintering the layer for one hour in a clean oven at 100 to 250° C. The top layer of in all of Examples 13 to 16 is prepared to have a refractive index of 1.25 for the d-line.

Figure 11:
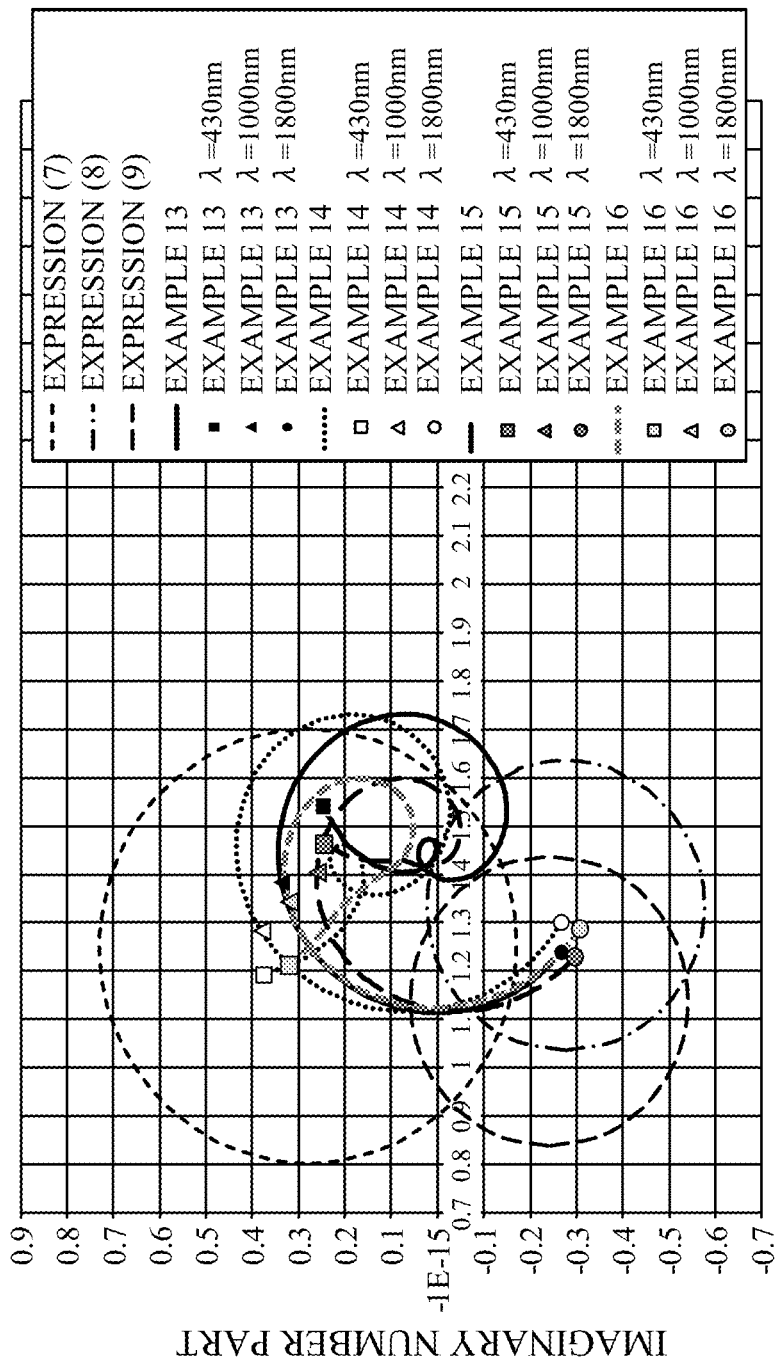
FIG. 11 illustrates complex coordinates of optical admittances according to Examples 13 to 16.

FIG. 11 illustrates complex coordinates of optical admittances in the base layer 11 (equivalent optical admittance from the substrate 0 to the base layer 11) according to Examples 13 to 16. In FIG. 11, the abscissa axis represents a real number part "a" in Y=a+ib, and the ordinate axis represents an imaginary number part "b." In FIG. 11, the conditional expression (7) is expressed by a short broken line, the conditional expression (8) is expressed by an alternate long and short dash line, and the conditional expression (9) is expressed by a long broken line.

FIG. 11 illustrates, through a solid line, a circularly short broken line, a circularly long broken line, and a gray broken line, the trajectories of the complex coordinates of the equivalent optical admittances according to Examples 13 to 16 in which the incident wavelength λ is 430 to 1800 nm. The complex coordinate when λ=430 nm is illustrated as a square point, the complex coordinate when λ=1000 nm is illustrated as a triangular point, the complex coordinate when λ=1800 n$_m$ is illustrated as a round point, and Examples 13 to 16 are classified by white, black, gray, and pale gray. It can be confirmed from FIG. 11 that the square point indicating the equivalent optical admittance when λ=430 nm is located inside the circle surrounded by the short broken line representing the conditional expression (7). It is also confirmed that the triangle point indicating the equivalent optical admittance when λ=1000 nm is located outside the circle surrounded by the alternate long and short dash line representing the conditional expression (8) and the round point illustrating the equivalent optical admittance when λ=1800 nm is located inside the circle surrounded by a long broken line representing the conditional expression (9).

Figure 12:
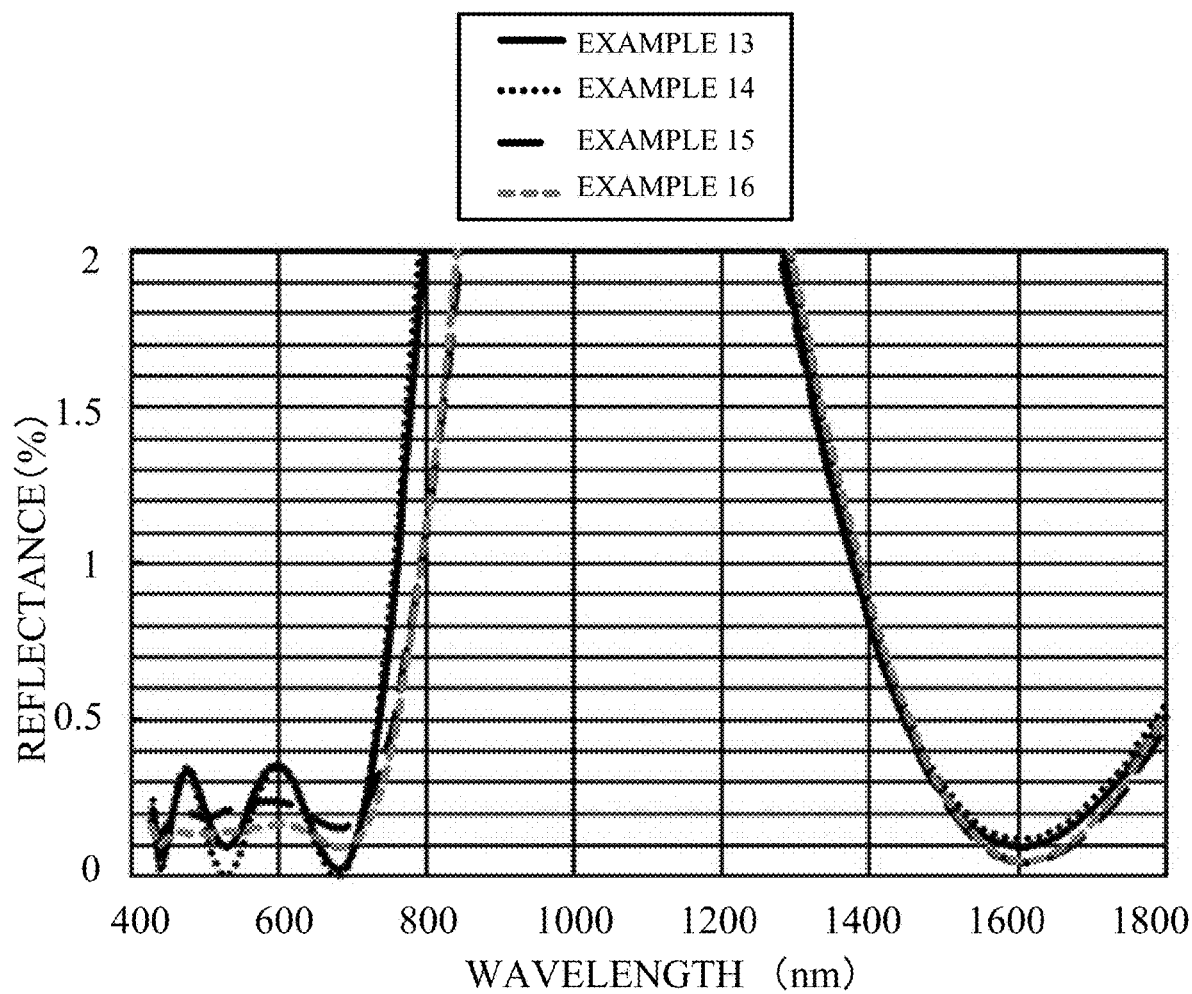
FIG. 12 illustrates reflectance characteristics according to Examples 13 to 16.

FIG. 12 illustrates the reflectance when the incident angle is 0° in the wavelength band of 430 to 1800 nm in Examples 13 to 16. A solid line represents the reflectance in Example 13, a short broken line represents the reflectance in Example 14, a long broken line represents the reflectance in Example 15, and a gray broken line represents the reflectance in Example 16. It is confirmed from FIG. 12 that the reflectance in the visible region (430 to 700 nm) is 0.4% or less and the reflectance in the wavelength band of 1450 to 1800 nm according to Examples 13 to 16 is 0.6% or less, and a high antireflection performance can be obtained.

TABLE 5

| | Material | Refractive index | | Example | | | |
|---|---|---|---|---|---|---|---|
| | | | | 13 | 14 | 15 | 16 |
| uppermost layer | Hollow SiO$_2$ | 1.25 | Physical film thickness (nm) | 111.3 | 133.7 | 116.9 | 136.6 |
| 9th layer | Ta$_2$O$_5$ | 2.30 | | | | | 4.7 |
| 8th layer | SiO$_2$ | 1.46 | | | | 190.5 | 152.1 |
| 7th layer | Ta$_2$O$_5$ | 2.30 | | | 5.0 | 10.0 | 9.4 |
| 6th layer | SiO$_2$ | 1.46 | | 210.7 | 168.4 | 67.5 | 73.6 |
| 5th layer | Ta$_2$O$_5$ | 2.30 | | 9.0 | 7.6 | 28.6 | 28.1 |
| 4th layer | SiO$_2$ | 1.46 | | 62.6 | 71.4 | 44.9 | 44.3 |

TABLE 5-continued

|  | Material | Refractive index |  | Example | | | |
|---|---|---|---|---|---|---|---|
|  |  |  |  | 13 | 14 | 15 | 16 |
| 3rd layer | $Ta_2O_5$ | 2.30 |  | 27.8 | 27.0 | 31.1 | 33.4 |
| 2nd layer | $SiO_2$ | 1.46 |  | 42.1 | 42.9 | 41.6 | 40.4 |
| 1st layer | $Ta_2O_5$ | 2.30 |  | 19.9 | 22.6 | 11.7 | 13.1 |
|  | Substrate |  | Refractive index | 1.70 | 1.70 | 1.70 | 1.70 |

Examples 17 to 22

The antireflection film 10 according to Examples 17 to 22 has a multilayer film with eleven to sixteen layers. In Examples 17 to 22, the materials of the thin films in the antireflection film 10 and the refractive index of the substrate 0 are the same.

Table 6 shows the film configuration and the refractive index for the d-line according to Examples 17 to 22 (587.6 nm). The base layer 11 is a layer other than the top layer and formed by the vacuum evaporation method. The top layer in each Example is prepared by adding a binder solution to a solution containing hollow $SiO_2$, by coating the layer with the mixed and prepared liquid by a spin coater, and by sintering the layer for one hour in a clean oven at 100 to 250° C. The top layer of in all of Examples 17 to 22 is prepared to have a refractive index of 1.25 for the d-line.

Figure 13:
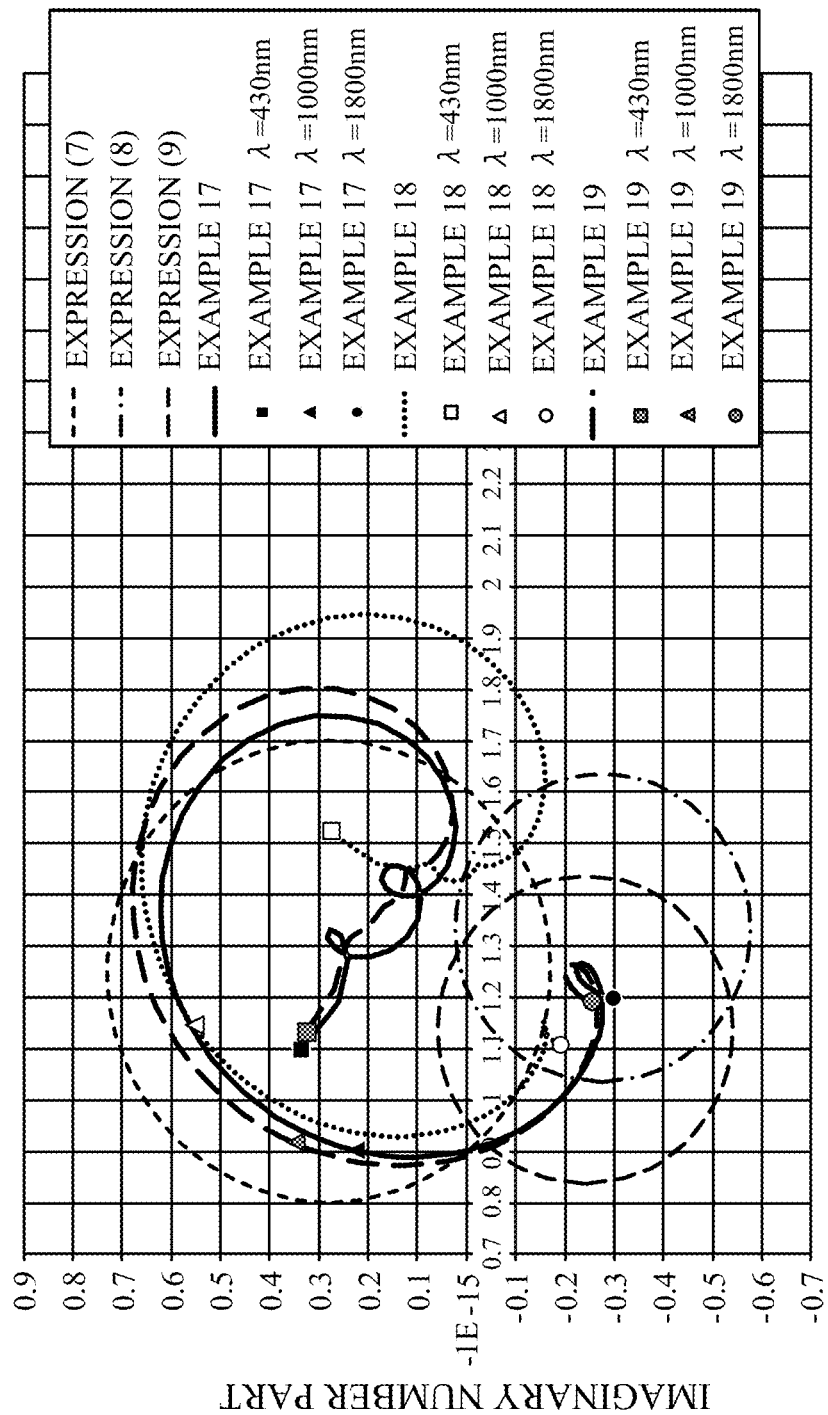
FIG. 13 illustrates optical admittances according to Examples 17 to 19 with complex coordinates.
Figure 14:
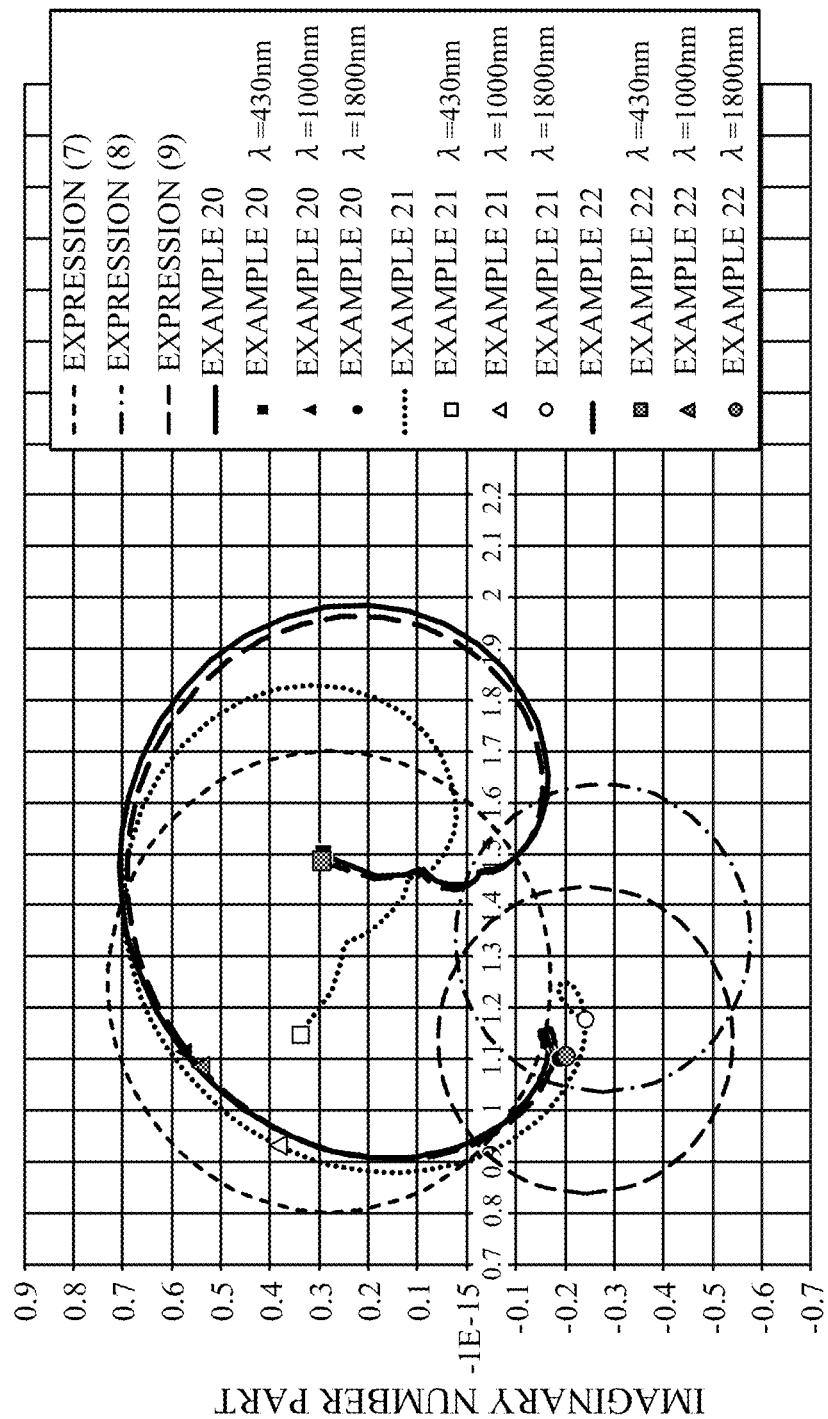
FIG. 14 illustrates complex coordinates of optical admittances according to Examples 20 to 22.

FIG. 13 illustrates complex coordinates of optical admittances in the base layer 11 (equivalent optical admittances from the substrate 0 to the base layer 11) according to Examples 17 to 19. FIG. 14 illustrates complex coordinates of optical admittances in the base layer 11 (equivalent optical admittance from the substrate 0 to the base layer 11) according to Examples 20 to 22. In FIGS. 13 and 14, the abscissa axis represents a real number part "a" in Y=a+ib, and the ordinate axis represents an imaginary number part "b." In FIGS. 13 and 14, the conditional expression (7) is expressed by a short broken line, the conditional expression (8) is expressed by an alternate long and short dash line, and the conditional expression (9) is expressed by a long broken line.

FIG. 13 illustrates, through a solid line, a short broken line, and a long broken line, the trajectories of the complex coordinates of the equivalent optical admittances according to Examples 17 to 19 in which the incident wavelength λ is 430 to 1800 nm. The complex coordinate when λ=430 nm is illustrated as a square point, the complex coordinate when λ=1000 nm is illustrated as a triangular point, the complex coordinate when λ=1800 nm is illustrated as a round point, and Examples 17 to 19 are classified by white, black, and gray. FIG. 14 illustrates, through a solid line, a short broken line, and a long broken line, the trajectories of the complex coordinates of the equivalent optical admittances according to Examples 20 to 22 in which the incident wavelength λ is 430 to 1800 nm. The complex coordinate when λ=430 nm is illustrated as a square point, the complex coordinate when λ=1000 nm is illustrated as a triangular point, the complex coordinate when λ=1800 nm is illustrated as a round point, and Examples 20 to 22 are classified by white, black, and gray.

It can be confirmed from FIGS. 13 and 14 that the square point indicating the equivalent optical admittance when λ=430 nm is located inside the circle surrounded by the short broken line representing the conditional expression (7). It is also confirmed that the triangle point indicating the equivalent optical admittance when λ=1000 nm is located outside the circle surrounded by the alternate long and short dash line representing the conditional expression (8) and the round point illustrating the equivalent optical admittance with λ=1800 nm is located inside the circle surrounded by a long broken line representing the conditional expression (9).

Figure 15:
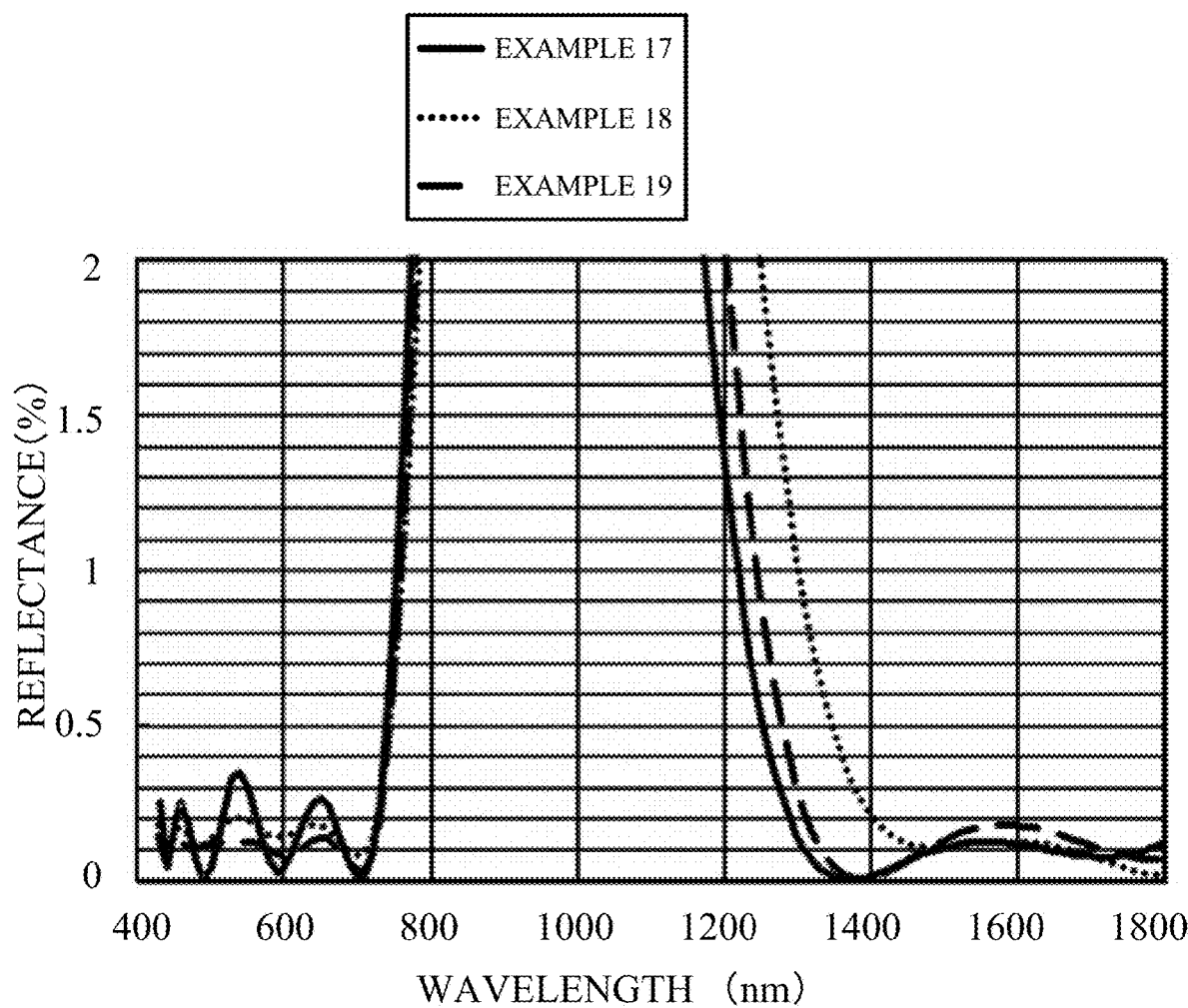
FIG. 15 illustrates reflectance characteristics according to Examples 17 to 19.

FIG. 15 illustrates the reflectance when the incident angle is 00 in the wavelength band of 430 to 1800 nm in Examples 17 to 19. A solid line represents the reflectance in Example 17, a short broken line represents the reflectance in Example 18, and a long broken line represents the reflectance in Example 19. It is confirmed from FIG. 15 that the reflectance in the visible region (430 to 700 nm) and the wavelength band of 1450 to 1800 nm according to Examples 17 to 19 is 0.4% or less, and a high antireflection performance can be obtained.

Figure 16:
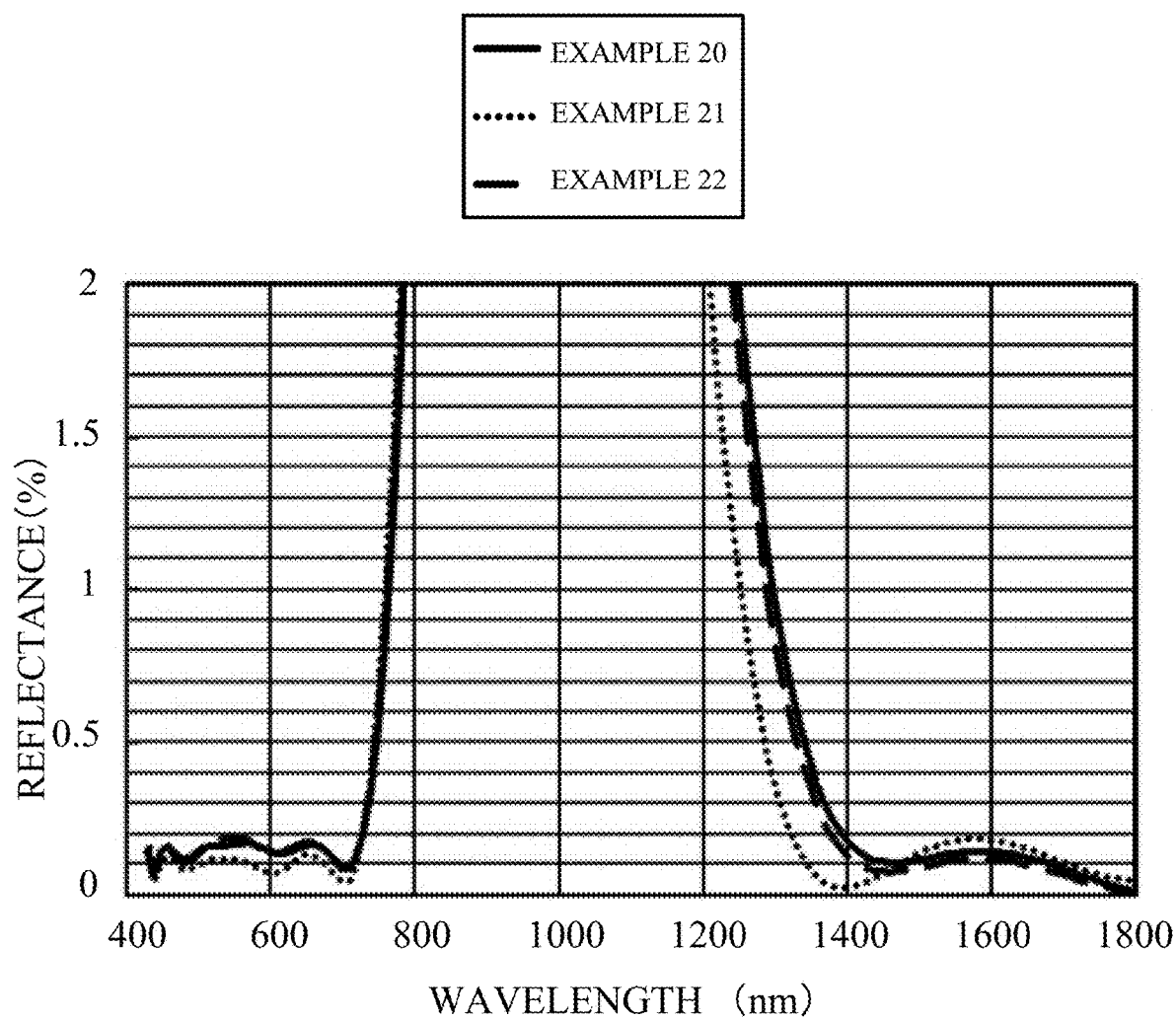
FIG. 16 illustrates reflectance characteristics according to Examples 20 to 22.

FIG. 16 illustrates the reflectance when the incident angle is 00 in the wavelength band of 430 to 1800 nm in Examples 20 to 22. A solid line represents the reflectance in Example 20, a short broken line represents the reflectance in Example 21, and a long broken line represents the reflectance in Example 22. It is confirmed from FIG. 16 that the reflectance in the visible region (430 to 700 nm) and the wavelength band of 1450 to 1800 nm according to Examples 20 to 22 is 0.3% or less, and a high antireflection performance can be obtained.

TABLE 6

|  | Material | Refractive index |  | Example | | | | | |
|---|---|---|---|---|---|---|---|---|---|
|  |  |  |  | 17 | 18 | 19 | 20 | 21 | 22 |
| uppermost layer | Hollow $SiO_2$ | 1.25 | Physical film thickness (nm) | 140.7 | 111.6 | 138.3 | 112.3 | 136.4 | 113.2 |
| 15th layer | $SiO_2$ | 1.46 |  |  |  |  |  |  | 183.0 |
| 14th layer | $Ta_2O_5$ | 2.30 |  |  |  |  |  | 5.0 | 5.0 |
| 13th layer | $SiO_2$ | 1.46 |  |  |  |  | 187.6 | 133.6 | 5.0 |
| 12th layer | $Ta_2O_5$ | 2.30 |  |  |  | 5.0 | 5.0 | 3.9 | 3.6 |
| 11th layer | $SiO_2$ | 1.46 |  |  | 147.7 | 134.5 | 5.0 | 5.0 | 5.0 |
| 10th layer | $Ta_2O_5$ | 2.30 |  | 4.8 | 4.8 | 9.4 | 7.7 | 4.7 | 3.1 |

TABLE 6-continued

| | Material | Refractive index | 17 | 18 | 19 | 20 | 21 | 22 |
|---|---|---|---|---|---|---|---|---|
| 9th layer | SiO$_2$ | 1.46 | 137.3 | 28.9 | 24.0 | 24.4 | 25.2 | 9.3 |
| 8th layer | Ta$_2$O$_5$ | 2.30 | 17.7 | 13.8 | 10.1 | 6.0 | 11.0 | 5.4 |
| 7th layer | SiO$_2$ | 1.46 | 39.9 | 29.2 | 27.5 | 16.0 | 26.9 | 26.8 |
| 6th layer | Ta$_2$O$_5$ | 2.30 | 152.3 | 149.4 | 150.9 | 148.5 | 150.0 | 150.2 |
| 5th layer | SiO$_2$ | 1.46 | 10.4 | 9.9 | 11.9 | 10.9 | 11.7 | 10.9 |
| 4th layer | Ta$_2$O$_5$ | 2.30 | 148.7 | 157.5 | 159.3 | 160.6 | 159.5 | 159.8 |
| 3rd layer | SiO$_2$ | 1.46 | 10.6 | 13.3 | 18.4 | 16.7 | 18.3 | 16.5 |
| 2nd layer | Ta$_2$O$_5$ | 2.30 | 18.2 | 25.9 | 31.8 | 31.9 | 31.8 | 31.2 |
| 1st layer | Al$_2$O$_3$ | 1.63 | 5.0 | 5.0 | 15.7 | 13.2 | 15.2 | 12.5 |
| | Substrate | Refractive index | 2.00 | 2.00 | 2.00 | 2.00 | 2.00 | 2.00 |

Example 23

Figure 17:
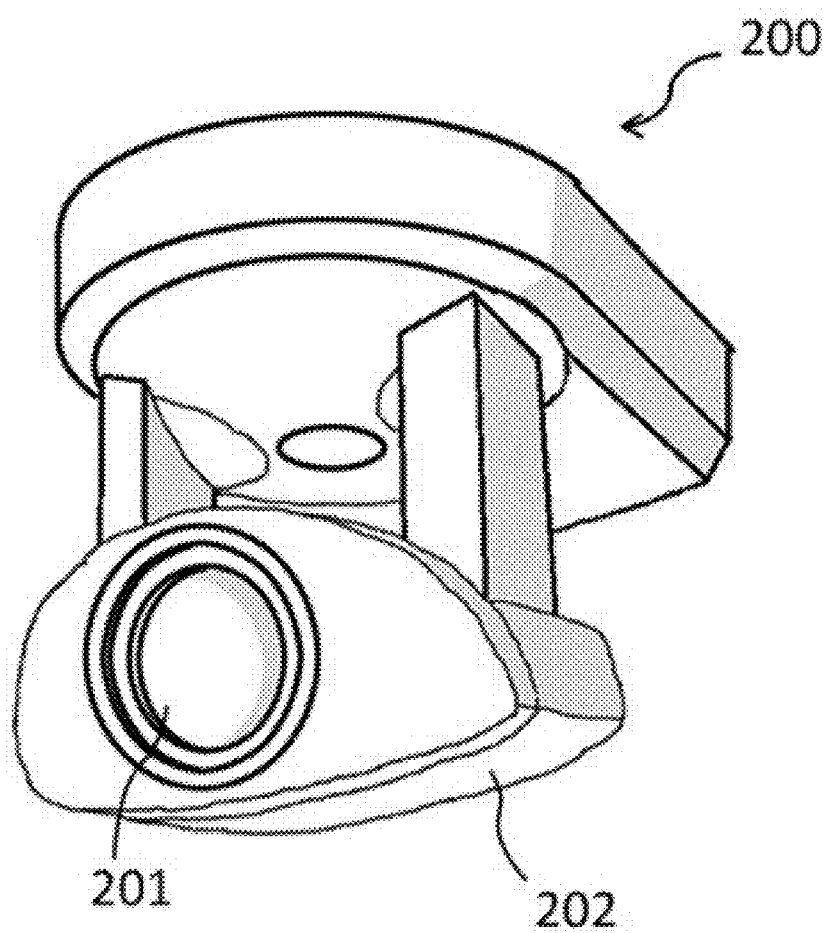
FIG. 17 is a perspective view of an optical apparatus according to Example 23.

FIG. 17 illustrates a monitoring network camera 200 as an optical apparatus according to Example 23 of the present invention. The monitoring network camera 200 includes an imaging optical system 201 configured to form an optical image of an object, and a housing (holder) 202 configured to hold the imaging optical system 201. The imaging optical system 201 includes a plurality of lenses.

The antireflection film 10 according to any one of Examples 1 to 22 is formed on at least one lens (optical element) among the plurality of lenses. This configuration can generate an image with harmful light suppressed such as flares and ghosts, and realize the high-performance camera 200 capable of obtaining more image information by increasing the transmission light.

This example discusses a network camera as an illustrative optical apparatus, but the antireflection film according to any one of Examples 1 to 22 can be provided on an optical element in the optical system applicable to a variety of optical apparatuses, such as an image apparatus other than the network camera and an interchangeable lens.

Each embodiment can provide an optical element having a high anti-reflection performance in a wavelength band in the visible region and the airglow region, a manufacturing method of the optical element, an optical system, and an optical instrument.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-195531, filed on Oct. 6, 2017, which is hereby incorporated by reference herein in its entirety.

What is claimed is:

1. An optical element comprising:
   a substrate; and
   an antireflection film formed on the substrate and including a plurality of layers,
   wherein the following conditions are satisfied:

$1.10 \leq n_m \leq 1.30$ when $\lambda=430$, $(a-1.25)^2+(b-0.28)^2 \leq 0.45^2$ when $\lambda=1000$, $(a-1.34)^2+(b+0.28)^2 \geq 0.30^2$ when $\lambda=1800$, $(a-1.14)^2+(b+0.24)^2 \leq 0.30^2$ where $n_m$ is a refractive index for a wavelength $\lambda$ (nm) of a top layer most distant from the substrate among the plurality of layers, and a base layer except the top layer among the plurality of layers has an optical admittance of $Y=a+ib$.

2. The optical element according to claim 1, wherein the following conditions are satisfied:

when $\lambda=430$, $(a-1.25)^2+(b-0.28)^2 \leq 0.41^2$ when $\lambda=1800$, $(a-1.14)^2+(b+0.24)^2 \leq 0.20^2$.

3. The optical element according to claim 1, wherein the following conditions are satisfied:

when $430 \leq \lambda \leq 700$ or $1450 \leq \lambda \leq 1800$, $(a-1.28)^2+(b)^2 \leq 0.55^2$, and when $900 \leq \lambda \leq 1100$, $(a-1.30)^2+(b+0.28)^2 \geq 0.25^2$.

4. The optical element according to claim 1, wherein the following expression is satisfied:

$125 \leq n_m d_m \leq 250$ where $d_m$ (nm) is a film thickness of the top layer.

5. The optical element according to claim 1, wherein a reflectance of the antireflection film for a light ray with an incident angle on the antireflection film of 0° to 15° inclusive is 1.0% or less where $430 \leq \lambda \leq 700$ or $1450 \leq \lambda \leq 1800$.

6. The optical element according to claim 1, wherein the antireflection film has seven layers or more.

7. The optical element according to claim 1, wherein the base layer includes a plurality of layers made of different materials, and the following conditional expression is satisfied:

$0.4 \leq n_H - n_L \leq 0.9$ where $n_H$ is the highest refractive index in the materials in the base layer, and $n_L$ is the lowest refractive index of the materials in the base layer.

8. The optical element according to claim 1, wherein the top layer has a void.

9. The optical element according to claim 1, wherein the top layer is made of silicon oxide or magnesium fluoride.

10. The optical element according to claim 1, wherein the layer in the base layer is made of oxide of titanium, tantalum, zirconium, chromium, niobium, cerium, hafnium, aluminum, silicon, and yttrium singularly or in mixture.

11. A manufacturing method of an optical element that includes a substrate, and an antireflection film formed on the substrate and including a plurality of layers, the manufacturing method comprising the steps of:
   producing a base layer except a top layer most distant from the substrate among the plurality of layers; and
   producing the top layer among the plurality of layers, wherein the following conditions are satisfied:

$$1.10 \leq n_m \leq 1.30$$

$$\text{when } \lambda=430, (a-1.25)^2+(b-0.28)^2 \leq 0.45^2$$

$$\text{when } \lambda=1000, (a-1.34)^2+(b+0.28)^2 \geq 0.30^2$$

$$\text{when } \lambda=1800, (a-1.14)^2+(b+0.24)^2 \leq 0.30^2$$

where $n_m$ is a refractive index for a wavelength $\lambda$ (nm) of the top layer, and the base layer has an optical admittance of $Y=a+ib$.

12. The manufacturing method according to claim 11, wherein the step of producing the top layer produces the top layer by a sol-gel method.

13. The manufacturing method according to claim 11, wherein the step of producing the base layer produces the base layer by a vacuum evaporation method or a sputtering method.

14. An optical system comprising a plurality of optical elements, at least one of which includes an optical system according to claim 1.

15. An optical apparatus comprising an optical element according to claim 1, and a holder configured to hold the optical element.

* * * * *